(12) United States Patent
Gschwind

(10) Patent No.: US 7,840,954 B2
(45) Date of Patent: Nov. 23, 2010

(54) COMPILATION FOR A SIMD RISC PROCESSOR

(75) Inventor: Michael Karl Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1393 days.

(21) Appl. No.: 11/289,086

(22) Filed: Nov. 29, 2005

(65) Prior Publication Data

US 2007/0124722 A1 May 31, 2007

(51) Int. Cl.
*G06F 9/45* (2006.01)
*G06F 15/76* (2006.01)
(52) U.S. Cl. .................. 717/159; 717/106; 717/152; 717/153; 712/1; 712/2
(58) Field of Classification Search .................. None
See application file for complete search history.

(56) References Cited

U.S. PATENT DOCUMENTS

| | | | | | |
|---|---|---|---|---|---|
| 5,901,316 | A | * | 5/1999 | Goebel | 717/158 |
| 6,571,328 | B2 | * | 5/2003 | Liao et al. | 712/35 |
| 6,826,677 | B2 | * | 11/2004 | Topham | 712/217 |
| 6,999,985 | B2 | * | 2/2006 | Symes et al. | 708/524 |
| 7,418,698 | B2 | * | 8/2008 | Lapkowski | 717/149 |
| 2003/0037221 | A1 | * | 2/2003 | Gschwind et al. | 712/3 |
| 2004/0064810 | A1 | * | 4/2004 | Wang et al. | 717/159 |
| 2004/0064811 | A1 | * | 4/2004 | Altmejd | 717/159 |

OTHER PUBLICATIONS

Eichenberger, Vectorization for SIMD Architectures with Alignment Constraints, May 2004, ACM SIGPLAN Notices, vol. 39, Issue 6, SESSION: Parellization, pp. 82-93.*

* cited by examiner

*Primary Examiner*—Lewis A Bullock, Jr
*Assistant Examiner*—Chris Nelson
(74) *Attorney, Agent, or Firm*—Yee & Associates, P.C.; Matthew B. Talpis

(57) ABSTRACT

A computer implemented method, data processing system, and computer usable code are provided for generating code to perform scalar computations on a Single-Instruction Multiple-Data (SIMD) Reduced Instruction Set Computer (RISC) architecture. The illustrative embodiments generate code directed at loading at least one scalar value and generate code using at least one vector operation to generate a scalar result, wherein all scalar computation for integer and floating point data is performed in a SIMD vector execution unit.

17 Claims, 14 Drawing Sheets

*FIG. 8B*

BEGIN
↓
812 — GENERATE IR TO COMPUTE REALIGNMENT AMOUNT
↓
814 — INJECT GENERATED IR INTO IR PROGRAM REPRESENTATION
↓
816 — USE OPTIMIZATION TECHNIQUES TO OPTIMIZE IR COMPUTING REALIGNMENT AMOUNT
↓
818 — GENERATE CODE FROM IR
↓
END

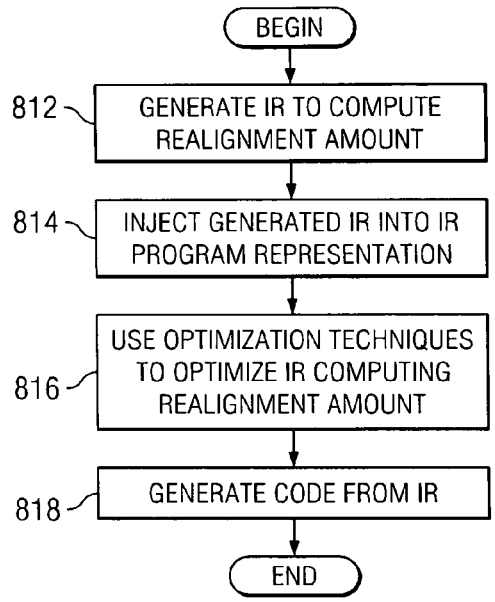

*FIG. 9A*

```
float
  foo(...)
  {
    float a, b, c, d;
    float e, f, g, h;
    float r;

905 ⟶ r = a + f;

return r;
  }
```
900

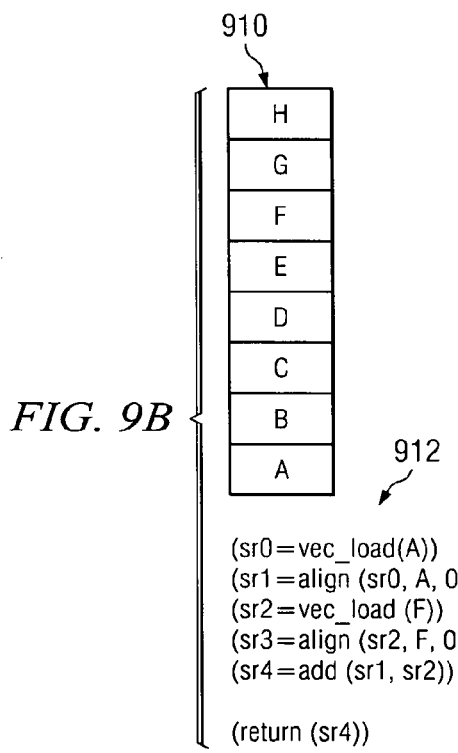

912
(sr0 = vec_load(A))
(sr1 = align (sr0, A, 0))
(sr2 = vec_load (F))
(sr3 = align (sr2, F, 0))
(sr4 = add (sr1, sr2))

(return (sr4))

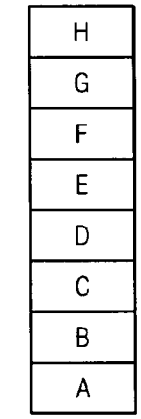

*FIG. 9C*

...
920 ⟶ LQD r4, rA
922 ⟶ LQD r2, rF
924 ⟶ ROTQBY r1, r0, rA
926 ⟶ ROTQBY r3, r2, rF
928 ⟶ FA r3, r1, r2
930 ⟶ BI r0

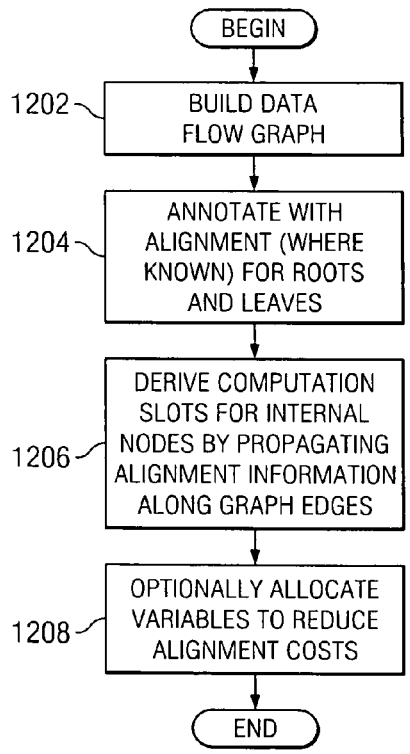

FIG. 11B

```
        ila    r4, 0x00010203    ; load control word to replicate
        lqd    r2, CPL_f2222     ; load 4x2.0 vector from constant pool
        shufb  r3, r3, r4        ; replicate scalar in slots
        il     r1, 0             ; load loop index
loop:
        lqx    r64, r100, r1     ; load a[]
        lqx    r65, r101, r1     ; load b[]
        fm     r66, r64, r2      ; a[]*2.0
        fcgt   r63, r64, r65     ; mask=a[]>b[]
        fm     r67, r65, r3      ; b[] * s'[]
        selb   r68, r67, r66, r63 ; mask[] ? a'[] : b'[]
        stqx   r68, r102, r1     ; store m[]
        ai     r1, r1, 4         ; increment loop index in preferred slot
        cgt    r10, r1, 99       ; loop bounds check
        brnz   r10, loop         ; loop
```

BEGIN

1202 — BUILD DATA FLOW GRAPH

1204 — ANNOTATE WITH ALIGNMENT (WHERE KNOWN) FOR ROOTS AND LEAVES

1206 — DERIVE COMPUTATION SLOTS FOR INTERNAL NODES BY PROPAGATING ALIGNMENT INFORMATION ALONG GRAPH EDGES

1208 — OPTIONALLY ALLOCATE VARIABLES TO REDUCE ALIGNMENT COSTS

END

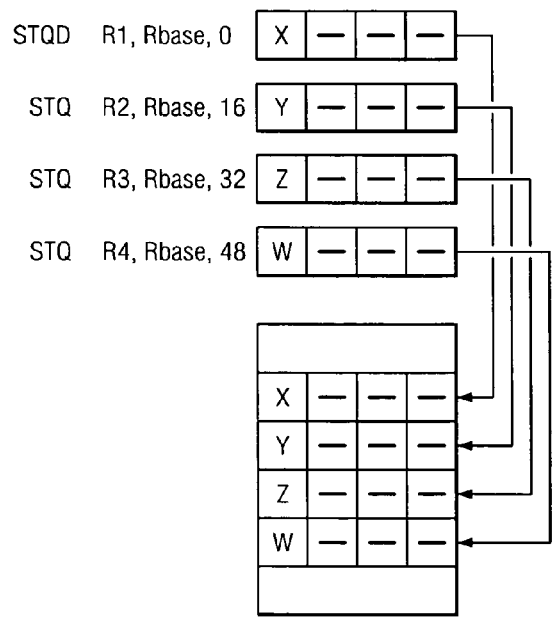

COMPILATION FOR A SIMD RISC PROCESSOR

BACKGROUND

1. Field of the Invention

The present application relates generally to source programs. More specifically, the present application relates to the compilation of source programs to a machine language representation and, more particularly, to compiling programs for a SIMD RISC processor.

2. Description of the Related Art

Contemporary high-performance processor designs provide data-parallel execution engines to increase the amount of performance available to application programs by using single-instruction multiple-data (SIMD) parallelism. These instructions encompass a variety of instruction set extensions, such as the IBM Power Architecture™ Vector Media extensions (VMX). FIG. 1 depicts the exemplary operation of a SIMD instruction on a 4-element vector.

While SIMD extensions for conventional microprocessors have exploited the significant data parallelism found in many programs, the related cost has resulted in increased design complexity. Referring now to FIG. 2, a state-of-the-art industry standard microprocessor implementing the Power Architecture™ is depicted, which consists of a number of execution units, such as two load/store units, two fixed point units, one condition execution unit, one branch execution unit, one vector permute unit, one vector simple fixed point unit, one vector complex fixed point unit, and a vector single precision floating point unit. The design also contains a fixed point register file, a floating point register file, a condition register file, a branch execution (Link/Count) register file, and a vector register file.

While the architecture, as the one demonstrated in FIG. 2, allows a high performance reach, resource duplication, such as separate vector and scalar execution units and register files, has to be maintained. Thus, while the architectures provided today can provide high performance, the resource requirements are excessive, resulting in increased chip area, cost, and power dissipation, as well as increased design, verification effort, and complexity. In another undesirable aspect of the shown architecture, sharing of operands between vector and scalar computation units is difficult, as it involves a move across register files, involving significant overhead cost.

In prior art, the Intel Streaming SIMD Extensions (SSE) architecture can share execution of scalar and data-parallel computations using the SSE and SSE2 instruction set extensions. Furthermore, the prior art requires special hardware support to provide both scalar and data-parallel execution, such as special scalar compute and data access operations. These scalar operations are specified to perform partial writes into registers. Disadvantageously, the architectural specification and its implementations are directed at sharing a single (scalar) execution unit for both scalar and data-parallel computation. Finally, as represented, for example, by the partial write specification of the scalar operations, the specification makes efficient implementation with data-parallel paths unnecessarily complex and expensive.

SUMMARY

The illustrative embodiments provide a computer implemented method, data processing system, and computer usable code for generating code to perform scalar computations on a SIMD RISC architecture. Code is generated directed at loading at least one scalar value and code is generated using at least one vector operation to generate a scalar result, wherein all scalar computation for integer and floating point data is performed in a SIMD vector execution unit.

BRIEF DESCRIPTION OF THE DRAWINGS

The novel features believed characteristic of the application are set forth in the appended claims. The application itself, however, as well as a preferred mode of use, further objectives and advantages thereof, will best be understood by reference to the following detailed description of an illustrative embodiment when read in conjunction with the accompanying drawings, where:

FIG. 8B depicts a flowchart for generating and optimizing realignment code in accordance with an illustrative embodiment;

FIG. 9A depicts exemplary application code in accordance with an illustrative embodiment;

FIG. 9B depicts exemplary symbol information and intermediate representation in accordance with an illustrative embodiment;

FIG. 9C depicts machine code generated from intermediate representation in accordance with an illustrative embodiment;

FIG. 11B depicts code corresponding to code schema for an exemplary SIMD RISC architecture in accordance with an illustrative embodiment;

FIG. 12 depicts a flowchart of the implementation of an improved selection of a computation slot in accordance with an illustrative embodiment;

FIGS. 13A and 13B depict exemplary source code sequences comparing spill using only store to memory instructions and spill using pack and store instructions in accordance with an illustrative embodiment;

DETAILED DESCRIPTION OF THE PREFERRED EMBODIMENT

Figure 1:
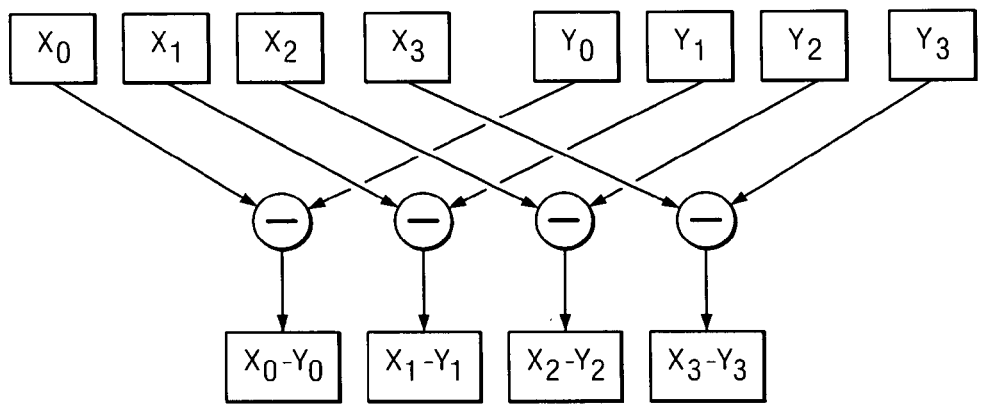
FIG. 1 depicts an exemplary operation of a SIMD instruction on a 4-element vector.

The illustrative embodiments are directed at Single-Instruction Multiple-Data (SIMD) Reduced Instruction Set Computer (RISC) architectures and, more specifically, at providing a method to generate code for a SIMD RISC architecture where an architecture provides only data-parallel SIMD instructions as computational elements. In accordance with an aspect of the illustrative embodiments, a vector instruction may be used in one of two modes: a first vector mode, and a second scalar mode.

A SIMD RISC architecture is an architecture offering merged scalar and data-parallel vector capabilities, and specifically, merged data paths, and register files. In such an architecture, no additional register files are present to hold scalar integer or floating point data. All addresses and condition information that serve as input for computational operations (i.e., excluding summary overflow status, the instruction address register, and other special purpose registers) are also maintained in vector registers.

In an illustrative embodiment, a single unified vector register file is supported, the register file being unified with respect to storing scalar and vector SIMD data, and with respect to storing data of several multiple data types.

In another illustrative embodiment, multiple unified register files are supported. The unified register files are unified with respect to storing scalar and SIMD data, but each register file is dedicated to a separate data type, which includes but is not limited to, a first register file for storing integer (scalar and vector) data, a second register file for storing floating point (scalar and vector) data, and so forth. In accordance with the illustrative embodiments, the sharing of scalar and vector results is simplified by the unified scalar/data-parallel register file structure, selective vector elements may be used as operands in scalar computations, and scalar results may be computationally combined with vector results.

Support for specifying scalar operands for inherently scalar operations, such as, providing a memory address for memory instructions or branches, providing branch conditions, and providing control words for a number of instructions is provided, the SIMD RISC architecture supports a "preferred slot" to locate scalar data within a vector at a specified location. In one illustrative embodiment, the preferred slot paradigm is optionally used in an application binary interface specification (ABI) to compile scalar applications in a SIMD hardware execution environment and to define the default location of scalar data for function call interfaces.

In an illustrative embodiment, a SIMb RISC processor is implemented using a statically scheduled architecture. In a statically scheduled embodiment, the SIMD RISC processor is bundle-oriented and respects all dependencies present in the code stream. In another illustrative embodiment, the SIMD RISC processor is a Very-Long Instruction Word (VLIW) processor. In yet another illustrative embodiment, the SIMD RISC processor is implemented using dynamic instruction scheduling techniques.

In conjunction with the static scheduling embodiment, the compiler performs optimized scheduling for the static architecture, including insertion of static branch prediction hints. The compiler reduces branch penalties by generating code exploiting data-parallel select operations.

In accordance with the definition of vector instructions, a vector instruction write-updating a register is considered a vector register instruction only if it write-updates a vector in its entirety. In accordance with this specification, a portion of the vector target register may be architecturally written with a default value, or a boundedly undefined value, but not be defined to remain unmodified when another portion of the vector register is written. Writing a boundedly undefined value in architectural terms may be implemented as not writing in at least one implementation of an architecture.

The terms SIMD vector instruction and data-parallel instruction, are used interchangeably to refer to a vector instruction. Scalar value refers to a single value in accordance with an input program representation. A vector consists of a collection of scalar values, each scalar stored in a slot, the slot representing a position in a vector. The terms "subvector" and "subvector value" refer to a subset of slots. Subvector and subvector value may refer to one of one or a plurality of scalar values contained in a vector, but not the entirety of scalar values comprising a vector.

Vector instructions can have either cross-vector semantics, wherein an operation is performed across the entire vector, or vector element semantics, wherein the operation is performed independently upon each vector element contained in a vector slot.

The term "word" refers to a data item, and preferably to a data item of preferred size. In one embodiment, a word is also used to store a memory address. In accordance with one embodiment, a word contains 32 data bits. The term "subword" refers to a data item being smaller than a word. The term "superword" refers to a data item being larger than a word. Preferably, subwords, words, and superwords are multiples of a byte data size.

The term internal representation (IR) may refer to variety of representation formats commonly used by compilers. In one embodiment, a quadruple code is the internal representation. In another embodiment, a pseudo-assembly language format is the internal representation. In yet another embodiment, actual machine code may also take the place of an internal representation in many instances.

Figure 3:
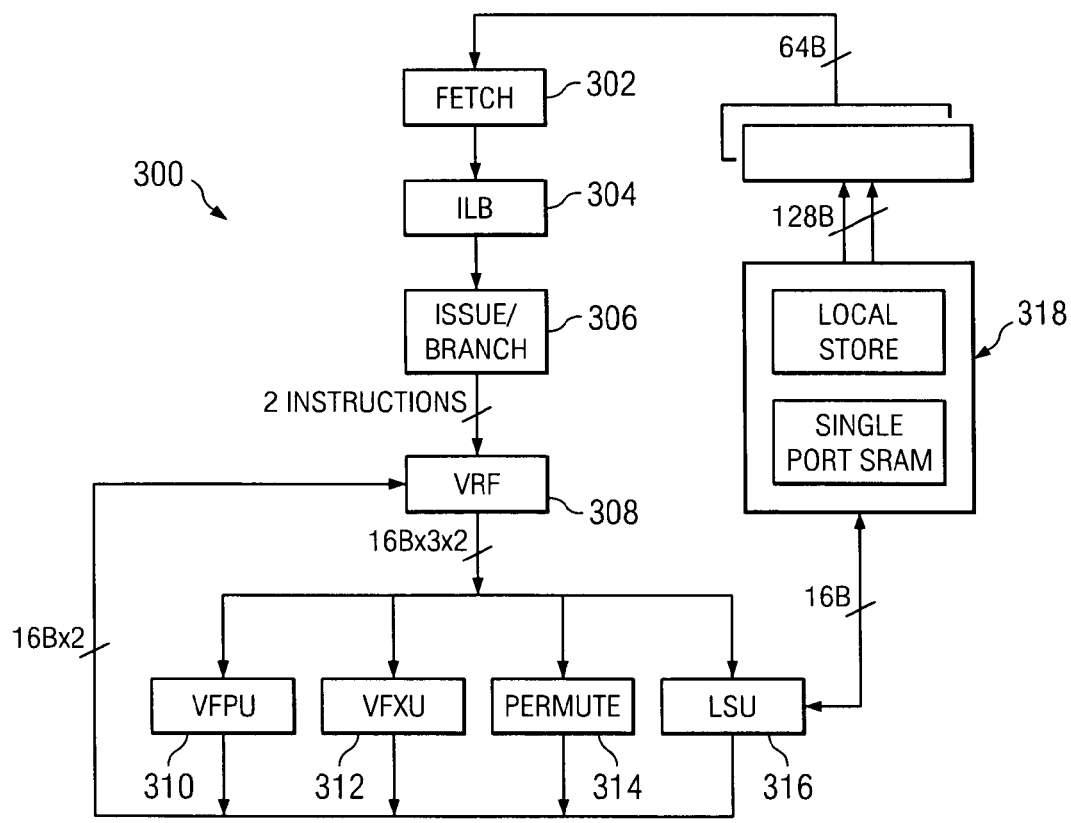
FIG. 3 depicts an exemplary embodiment of a SIMD RISC processor, and more specifically a Synergistic Processor Unit in accordance with an illustrative embodiment.
Figure 2:
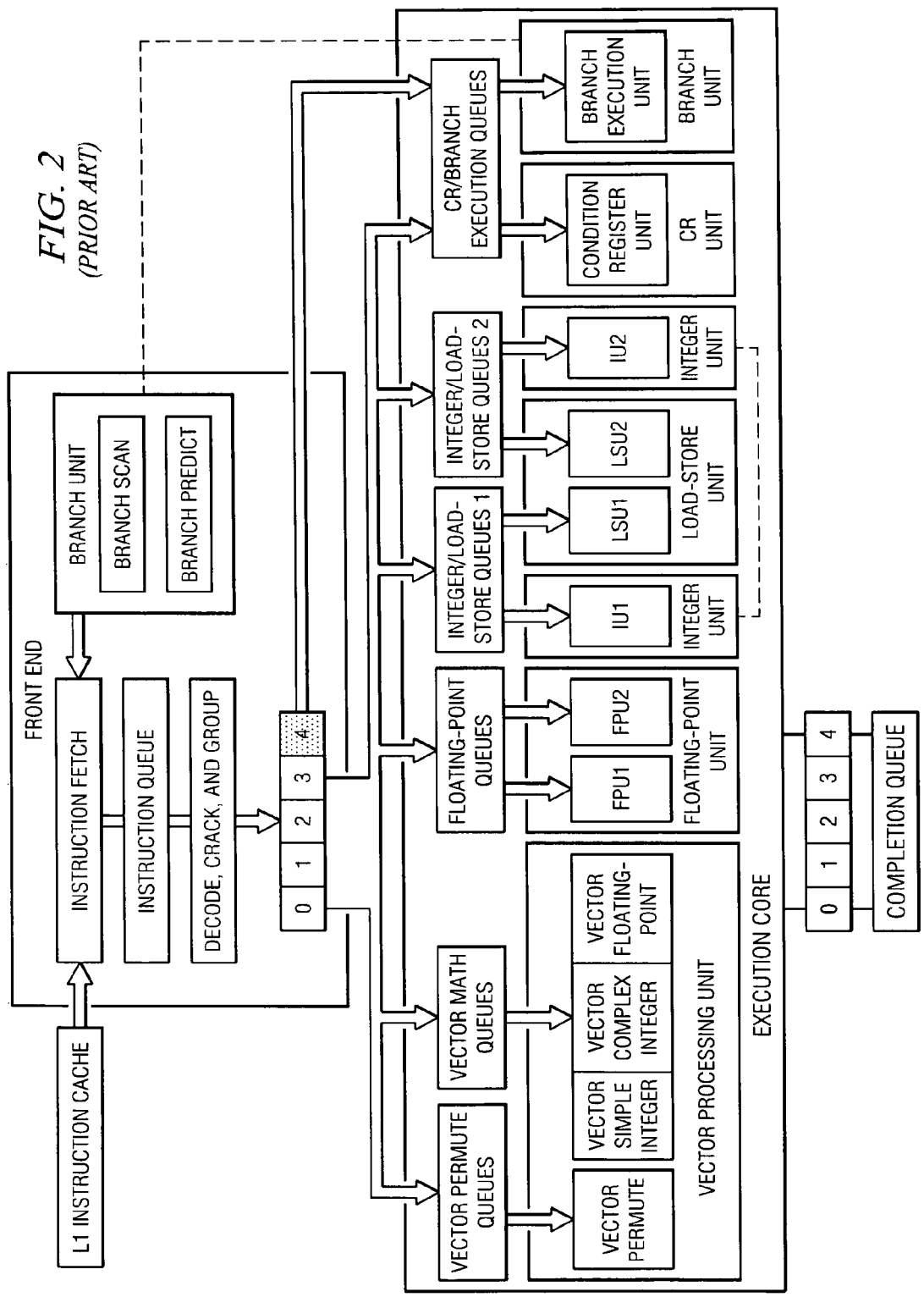
FIG. 2 depicts a state-of-the-art industry standard microprocessor implementing the Power Architecture™.

Referring now to FIG. 3, an exemplary embodiment of a SIMD RISC processor is shown, and more specifically a Synergistic Processor Unit in accordance with an illustrative embodiment. RISC processor 300 uses fetch unit 302 to fetch instruction, which are then buffeted into instruction line buffer (ILB) 304. The instructions are then issued using instruction issue/branch unit 306 as instruction bundles with up to two instructions per cycle to a data-parallel execution block. Operands for all instructions are supplied by unified Vector Register File (VRF) 308 providing up to three 128 bit input operands for each instruction. In this example, the execution block consists of two execution complexes, termed "even" and "odd" complex, corresponding to the locations within a bundle (a first even slot at offset 0, and a second odd slot at instruction offset 1, i.e., byte offset 4).

In this example, the even execution complex consists of data-parallel SIMD computation pipelines for SIMD floating point (VFPU) 310 and SIMD fixed point (VFXU) execution 312; and the odd execution complex consists of a data alignment complex, consisting of a vector permute (PERM) 314 and a load/store unit (LSU) 316, as well as other miscellaneous units, such as branch completion, optional channel instructions, and so forth (not shown).

In this exemplary SIMD RISC architecture, each execution pipeline 310, 312, 314, and 316 execute on 128 bit input operands and produce 128 bit output operands. This illustrative embodiment may read up to three 128 bit operands per instruction, and generate one 128 bit output operand. In a SIMD RISC architecture, the architecture does not provide separate scalar execution paths. Instead, all scalar computation is layered on the data-parallel datapath.

It is therefore an object to provide a method for compiling scalar code to execute on a data-parallel data path which has evaded those skilled in the art.

Load/store unit (LSU) 316 provides a memory interface to local store, single port SRAM 318 of 16 byte (128 bit) data width and the interface is optimized for the retrieval of aligned 16 byte data elements. In another embodiment, the LSU 316 accesses system memory. Aligned data words are read-accessed from the local store by truncating the address to retrieve a quadword including the at least one byte specified by the address supplied to the memory instruction. No data alignment network is provided as providing such would increase the latency of the basic memory access (whether used for a specific access or not) and increase design complexity. Therefore, a method is provided to generate efficient data alignment code, further optimize the alignment within the vector, and allocation of data to positions within vectors, to reduce the cost of compiler-directed data alignment.

In SIMD RISC architecture 300, no data alignment function is provided as an implicit function in the data store path. Such data alignment functions would increase hardware complexity and data store latency, whether used for a specific access or not. Also provided is store element functionality, which may require a data load/merge/store sequence.

Therefore, the illustrative embodiments provide a method to generate efficient data store code, by generating load/merge/store or store-element sequences, and furthermore optimize alignment and allocation of data to minimize this cost.

Figure 4A:
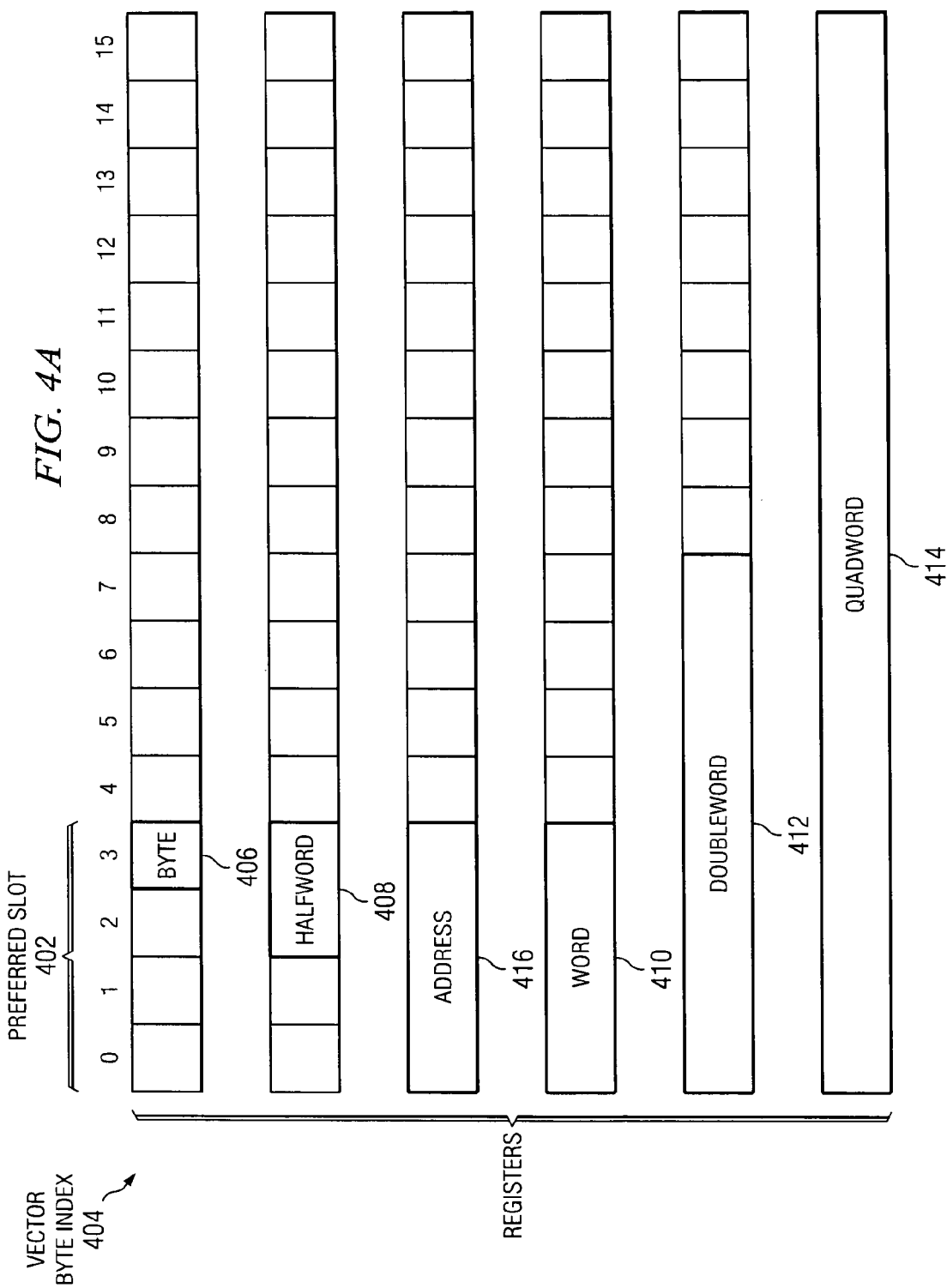
FIGS. 4A, 4B, and 4C depict three exemplary allocations of a preferred slot position in a vector register file in accordance with an illustrative embodiment.
Figure 4B:
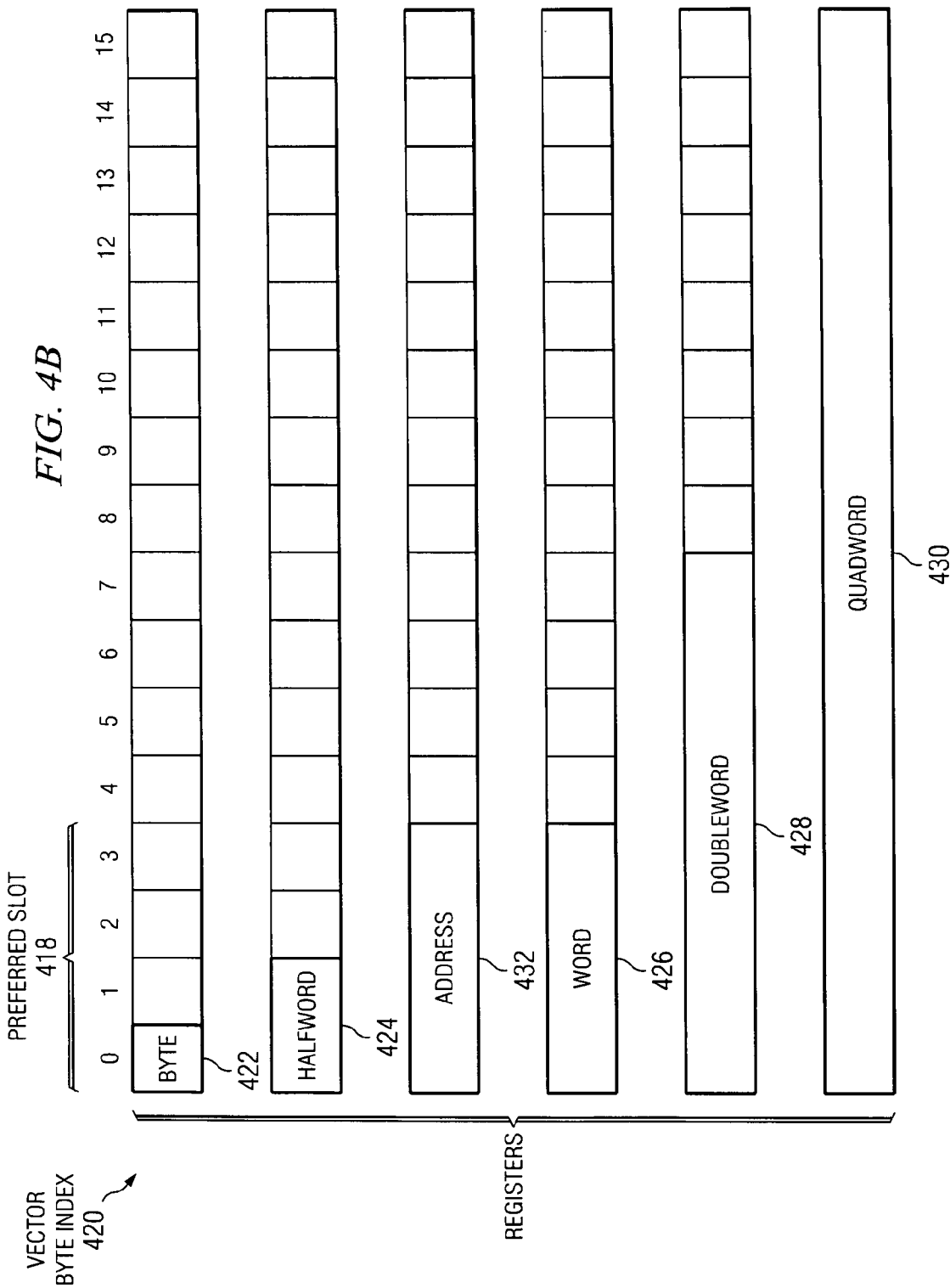
Figure 4C:
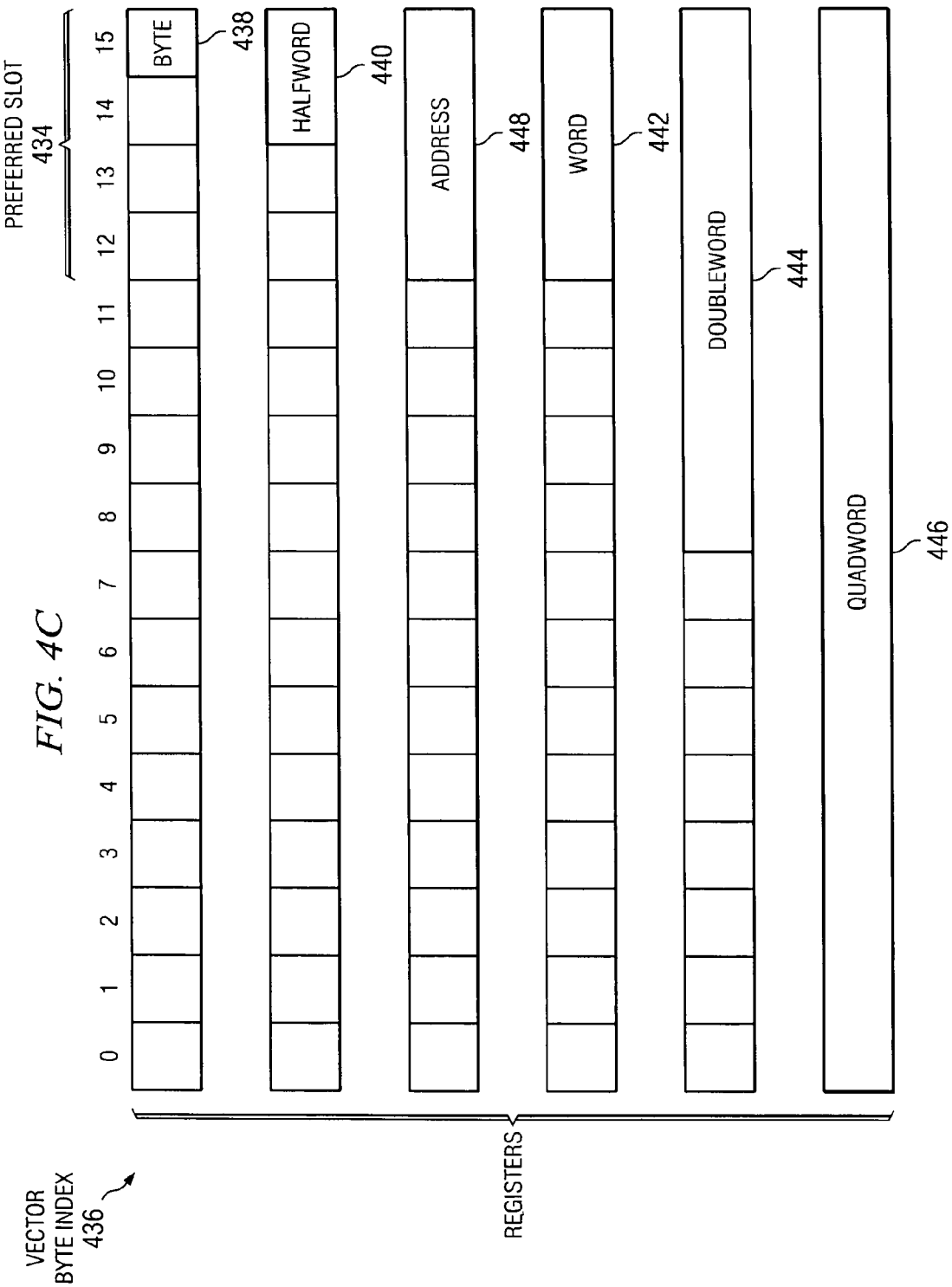

Referring now to the support for specifying scalar operands for inherently scalar operations, such as, providing a memory address for memory instructions or branches, providing branch conditions, and providing control words for a number of instructions. FIGS. 4A, 4B, and 4C demonstrate three exemplary allocations of a preferred slot position in a vector register file in accordance with an illustrative embodiment. In a illustrative embodiment, the preferred slot concept is also extended to the application binary interface (ABI), to specify the location of scalar operands passed between different parts of the program (including, but not limited to, the passing of function call parameters). In another aspect of preferred slot use, some implementations of compilers perform all scalar computations in the preferred slot. In another embodiment, compilers perform methods to select the location of at least one of computation slot and parameter passing slot.

In accordance with illustrative embodiments, integral data types are always allocated at their natural alignment boundary, i.e., for an element of size n bytes, the element is allocated at a byte address being the multiple of n bytes. (Elements note having a size being of the form $n=2^k$ are preferably aligned at a boundary corresponding to the next element size $n'=2^k$.) In accordance with illustrative embodiments, allocating objects at their natural alignment boundary prevents objects from crossing unit boundaries of larger objects of size $2^k$, such as vector size, memory line, and page size. Thus, each data type may be loaded by a single load quadword without concern to crossing data object boundaries.

While objects are naturally aligned with respect to their object size, they have no particular alignment with respect to vector registers. Thus, to ensure scalar objects to properly process scalar objects within a vector register, data objects need to be re-aligned with respect to vector registers. A number of allocation strategies and support instructions are possible to ensure efficient alignment of scalar data with respect to allocation boundaries.

In FIG. 4A, preferred slot 402 is constituted by vector byte 404 positions 0 to 3 (in big-endian numbering counting from the most significant bit), where sub-words (specifically, byte 406 and halfword 408) are allocated to align their least significant bit with the least significant bit of word 410. However, long word data types (specifically, doublewords 412 and quadwords 414) are allocated to extend beyond preferred slot 402.

In this exemplary description, an optimized alignment is provided to reduce the cost of data-read alignment. By allocating the data to bytes 0 to 3, a rotate or shift left operation may be used to align word data based on the low-order address bits. In a data alignment sequence, a compiler may provide address operand 416 of a load instruction as a shift or rotate count to be interpreted modulo the vector length (i.e., ignoring the high-order bits of the address). In this example, alignment of subword data within preferred slot 402 requires computing a rotate or shift amount distinct from the low-order address bits. In this example, the following re-alignment factors, shown in Table 1, may be used in conjunction with rotate or shift left instructions interpreting their rotate argument to specify a byte shift amount, where the integral data types are aligned with respect to their object's natural alignment and where the object's address is indicated by the variable "A". This may be performed when a vector has been loaded with a load instructions retrieving an aligned vector object containing the specified address, such as, by truncating the low order address bits of "A" to force vector alignment.

TABLE 1

| Object size | Shift/rotate vector left by |
| --- | --- |
| Byte 406 | A − 3 |
| Halfword 408 | A − 2 |
| Word 410 | A |
| Doubleword 412 | A |
| Quadword 414 | Aligned with respect to vector |

Referring now to the alignment of addresses, predicates (condition values), and other types not shown, these data types are preferably aligned in accordance with their object size, that is, when an address is represented by a word, address 416 is aligned at word 410 boundary and, when a predicate is represented by one of a byte, a halfword, and a word, is preferably re-aligned in accordance with byte 406, halfword 408, and word 410 re-alignment factors, respectively.

When a data element is to be stored, it is preferably realigned within a vector to its target position in memory with respect to the vector boundaries. In one embodiment, this is accomplished by one of shifting or rotating the value right by the value indicated for load. In one embodiment, this is expressed by the use, of a specific rotate right or shift right instruction. In another embodiment, a rotate takes a byte rotate parameter modulo the vector size, and the rotate value is indicated by one of inverting the sign of the realignment factor, and subtracting the realignment factor from the size of the vector (in bytes). Those skilled in the art will understand other methods to compute suitable alignment values based on mathematical transformations taking into account specific properties of vector length, instruction parameter interpretation, and so forth.

Referring now to data storage, a number of sequences are possible. In accordance with one embodiment, a sequence based on sub-vector storage with respect to a full vector may be used. In accordance with another embodiment, a full line may be loaded, a merge may be performed, and the full line may be stored. Loading and storing a full line in conjunction with data merge has preferable memory interface simplification properties for the implementation of a processor being targeted by the illustrative embodiments, but requires special attention to memory update sequencing in a multithreaded environment when multiple threads may update sub vector data within the confines of a single aligned memory unit corresponding to the size of a vector register.

While this description and the alignment factors have been specified with respect to a specific slot use for specific data elements as shown in FIG. 4A, those skilled in the art will understand that the realignment factors herein specified may be modified to select any combination of other slots.

Referring now to the alignment of basic data types with respect to their position in memory, and with respect to a computation slot, a preferred target architecture offers at least one rotate or shift instruction allowing to specify a byte shift or rotate parameter (specified in the preferred slot), further interpreting the parameter as being specified modulo the size of the vector register in bytes. In one illustrative embodiment, a byte rotate instruction "rotate quadword by bytes" is generated by a compiler in accordance with the illustrative embodiments to re-align a word specified by address ra and loaded into a register rm with a loadquad instruction, the word being realigned into a target register rt:

| | |
|---|---|
| lqd | rm, 0(ra) |
| rotqby | rt, rm, ra |

Referring now to data load and realignment of a byte type in accordance with the illustrative embodiments for a slot assignment in accordance with FIG. 4A, the following sequence represents an illustrative implementation:

| | |
|---|---|
| lqd | rm, 0(ra) |
| ai | rb, ra, −3 |
| rotqby | rt, rm, rb |

In one alternate embodiment, special instruction forms are supplied to include the modification of alignment arguments, such as the subtraction of the byte offset 3 within a vector register file for load data realignment, or the modification of re-alignment factors for store re-alignment and merge. In such an embodiment, the exemplary load byte sequence shown hereinabove may be modified to eliminate the adjustment of the byte address with an additive constant −3, and use a sequence consisting of the first lqd followed by the specialized rotate form.

Those skilled in the art will understand that rotate and shift instructions as lined out hereinabove will align scalar subword types within their respective target locations, but leave data in remaining bytes of a word computation slot undefined (typically corresponding to memory contents in words surrounding the desired word). When subword data types are to be used in word computations, bytes and halfword must be one of zero-extended and sign-extended to a full word. In one embodiment, zero-extension is accomplished by performing a logical AND with constants 0xff, and 0xffff, for bytes and half words, respectively. In accordance with one illustrative embodiment, the compiler generates code to perform zero-extension using a logical AND operation with the constants to zero-extend a scalar subword data type stored within a vector register. Those skilled in the art will understand that zero-extension may be alternatively achieved with a specific zero-extending instruction and a compiler. The illustrative embodiments will use a zero-extend subword type to word instruction, if a novel vector element form of this instruction is provided, where such extension occurs within at least one slot of a vector operation.

In another embodiment, zero-extension is performed with a shift (or rotate, or other instruction as provided by the instruction set) to the most significant position in the vector, followed by a logical shift right by 3 and 2 bytes (for bytes and halfwords, respectively) to the desired target position. In accordance with illustrative embodiments, the compiler generates code to perform such sequences.

Now specifically referring to zero-extending a byte, using a dual-shift sequence in accordance with one illustrative embodiment, the compiler generates a byte rotate instruction "rotate quadword by bytes" to re-align a word to the most significant position, specified by address ra and loaded into a register rm with a loadquad instruction, the word being realigned into a target register rt. It then generates a vector element shift right (indicated by a vector element shift left immediate with negative shift count) to align within the preferred slot and force the high order bits to zero:

| | |
|---|---|
| lqd | rm, 0(ra) |
| rotqby | rt, rm, ra |
| shli | rt, rt, −24 |

Those skilled in the art will understand that the bit shift count used for the shift instruction corresponds to the address adjustment previously specified above. Those skilled in the art will also appreciate that, in this example, the shift count is expressed as bits using the specific instruction form, where the exemplary code sequence corresponding to byte realignment with zero-extension within a word, a shift factor of 24 bits corresponds to 3 bytes. Those skilled in the art will also appreciate that where separate instruction forms for rotate/shift by bytes and shift by bits are necessary for register specified quadword forms to allow efficient re-alignment, this is not necessary for shifts by constant. Where variable byte addresses have to be translated to bit offsets using a code generation method, generating additional instructions may cause performance degradation in the generated code. A code generation method to translate a constant byte offset to a constant bit offset does not incur a code performance penalty for the generated code.

Sign-extension may be achieved with a specific sign-extending instruction, and a compiler will use a sign-extend subword type to word instruction if a novel vector element form of this instruction is provided, where such extension occurs within at least one slot of a vector operation.

In another embodiment, sign-extension is performed with a shift (or rotate, or other instruction as provided by the instruction set) to the most significant position in the vector, followed by an arithmetic (i.e., sign-extending) shift right by 3 and 2 bytes for bytes and halfwords, respectively to the desired target position. In accordance with illustrative embodiments, the compiler generates code to perform such sequences.

Referring to zero-extending a byte using a dual-shift sequence, the compiler generates a byte rotate instruction "rotate quadword by bytes" to re-align a word to the most significant position, specified by address ra and loaded into a register rm with a loadquad instruction, the word being realigned into a target register rt. It then generates a vector element arithmetic shift right (indicated by a vector element shift left immediate with negative shift count) to align within the preferred slot and force the high order bits to be a replica of the sign bit:

| | |
|---|---|
| lqd | rm, 0(ra) |
| rotqby | rt, rm, ra |
| ashli | rt, rt, −24 |

Those skilled in the art will understand that the bit shift count used for the shift instruction corresponds to the address adjustment previously specified hereinabove. Those skilled in the art will appreciate that, in this example, the shift count is expressed as bits using the specific instruction form, where for the exemplary code sequence corresponding to byte realignment with zero-extension within a word, a shift factor 24 bits corresponds to 3 bytes. Those skilled in the art will also appreciate that whereas separate instruction forms for rotate/shift by bytes and shift by bits are necessary for register specified quadword forms to allow efficient re-alignment, this is not necessary for shifts by constant. Where variable byte addresses have to be translated to bit offsets using a code generation method, generating additional instructions may cause performance degradation in the generated code. A code generation method to translate a constant byte offset to a constant bit offset does not incur a code performance penalty for the generated code.

In another embodiment of a SIMD RISC architecture, there are provided novel rotate and mask instructions where a quadword rotate across a vector is performed, followed by one of a zero and a sign-extension in at least one slot, such that a subword data element being aligned is appropriately zero- or sign-extended during the rotate process. In one illustrative embodiment, the compiler generates code utilizing at least one of the novel rotate and mask vector element instructions.

Having described the data processing steps associated with subword data types in accordance with data storage in a vector register in accordance with the illustrative embodiments, those skilled in the art will understand that integer data conversion from words to subwords may be accomplished by a compiler by reusing a data value stored in a preferred slot as a subword data type, and conversion of subword data to word data may be accomplished using the shift, rotate, or other zero- and sign-extension methods lined out above.

In order to handle superword data, such as, data larger than 32 bits, and data transformations, which is "type casting" in accordance with the terminology of the C and C++ programming languages, those skilled in the art will understand that loading and alignment may be performed as outlined above.

In type casting from word or subword data to superword data, this type casting may be accomplished with either zero or sign-extension.

In one embodiment of a SIMD RISC architecture, novel superword element instructions for zero and sign-extensions are provided, where a word type in a specified element position is one of zero- and sign-extended and deposited in the superword position. In accordance with one embodiment of a compiler, the compiler generates code using at least one such instruction.

In accordance with another embodiment of a SIMD RISC architecture, a novel superword vector element shift right instruction may be used to perform one of zero- and sign-extension using logical shift right and arithmetic shift right, respectively. In accordance with one embodiment of a compiler, the compiler generates code using at least one such instruction.

In accordance with another embodiment of a SIMD RISC architecture, a novel vector-wide shift right instruction may be used to perform one of zero- and sign-extension using logical shift right and arithmetic shift right, respectively. In accordance with one embodiment of a compiler, the compiler generates code using at least one such instruction.

In accordance with another embodiment of a SIMD RISC architecture, no provision is made for shift across word vector elements. In one embodiment, the compiler generates a permute sequence to zero-extend a word to a superword, by selecting a set of first zero bytes corresponding to an extent of a first vector word element slot, slot number 0, and selecting bytes corresponding to the original word from a register containing the word being zero-extended.

In another embodiment, the compiler generates a cross-vector rotate sequence, or other such sequence, to align the low order four bytes to the target position, and uses a select or other instruction, such as, a novel vector word element AND operation with a vector of {0, 0xFEEFFFFFFFFFFFFF,DC, DC}—where "DC" denotes "do not care" values not having impact on the result—for use in conjunction with a zero-extension from word to doubleword, to force the high order bytes to "0".

In one embodiment of sign-extension, the compiler generates a first instruction sequence to generate at least one byte containing 8 replicas of the sign bit. In a second step, the compiler then generates a permute sequence where at least one byte is replicated in four byte positions corresponding to an extent of a first vector word element slot, slot number 0, and selecting bytes corresponding to the original word from a register containing the word being zero-extended.

In another embodiment, the compiler generates a sequence where in a first step, the compiler generates a register which contains a word of sign bit replicas in a vector word element slot, for example, using a novel vector word element shift right algebraic instruction shifting by 31 bits. In a second step, the compiler generates a cross-vector rotate sequence (or other such sequence) to align the low order four bytes to the target position, and, in a third step, the compiler uses a select or other instruction to merge the high order word having sign replicas with the low order word having the target value.

Referring now to type casting from a subword type to a superword, type, several implementations are possible. In one implementation, a subword type is first zero- or sign-extended to a word, followed by zero- or sign-extending to a superword, to implement subword to superword zero- and sign-extension, respectively. In other embodiments, the described approaches for word to superword casting are adapted, for example, by first rotating a subword to the high order positions of a word element. These adaptations within the scope of the illustrative embodiments will be readily apparent to those skilled in the art based on the descriptions and teachings contained hereinabove.

Referring now to type casting of super word to word types, a transfer of the low-order bytes to a preferred word slot position is necessary because the low-order byte positions of superword data types to not correspond to the low-order byte positions of word and subword data types.

In one embodiment, a compiler generates rotate or shift-type instructions such as "rotqbyi," rotate quadword by byte immediate, to perform the transfer of bytes. In another embodiment the compiler generates a sequence using at least one permute instruction to perform a transfer of low-order bytes.

Those skilled in the art will also understand that the compiler will generate a like sequence for converting superword data types to subword data types, as word data types may be used as subword data types in a data layout in accordance with a novel data layout shown in FIG. 4A.

While specific descriptions have been given using an exemplary set up data types and data widths, those skilled in the art will understand how to apply the teachings contained herein to other datatypes within the scope of the illustrative embodiments.

Referring now FIG. 4B, there is shown an alternate slot assignment where preferred slot 418 is also present in bytes 0 to 3 using vector byte index 420. Subword and superword data has been allocated to align the most significant bits of all data words, that is, single scalar byte 422 is preferably stored in byte 0, scalar halfword 424 in bytes 0 and 1, scalar word 426 in bytes 0 through 3, scalar doubleword 428 in bytes 0 through 7, and scalar quadword 430 in bytes 0 through 15.

This alternate implementation reflects a different set of tradeoffs in the specification of data representation and processing. Specifically, aligning the most significant bits in a preferred slot obviates the need for adjusting the re-alignment factor for non-word subvector data types shown for an embodiment in accordance with FIG. 4A. Instead, all loaded data types, the data types being aligned with respect to their natural data type alignment, having been loaded from an address "A" 432, may be re-alignment by specifying address "A" as re-alignment factor. In one illustrative embodiment, a byte rotate instruction "rotate quadword by bytes" is generated by a compiler in accordance with the illustrative embodiments to re-align any naturally aligned data types specified by address ra and loaded into a register rm with a loadquad instruction, the naturally aligned data type being realigned into a target register rt:

| | |
|---|---|
| lqd | rm, 0(ra) |
| rotqby | rt, rm, ra |

Those skilled in the art will understand that type casting between any types in an illustrative embodiment using the novel data layout in accordance with FIG. 4B, requires a data transfer.

Those skilled in the art will understand that the type casting implementations described hereinabove in accordance with FIG. 4A may likewise be applied to the embodiments of FIG. 4B within the scope of the illustrative embodiments.

Referring now to specific additional optimized embodiments, type casting within the confines of a vector element position may be performed efficiently by generating novel vector word element shift instructions.

Specifically, subwords may be zero- and sign-extended by using novel vector element logical and arithmetic shift right instructions, respectively, where the shift count represents the difference in size between source and target data type involved in the data type conversion. Conversely, data conversion to subwords may be performed using novel vector element shift left instructions, where the shift count represents the difference in size between source and target data type involved in the data type conversion.

In accordance with FIG. 4C, an alternative assignment of the preferred slot is shown. In accordance with this exemplary allocation, preferred slot 434 is constituted by vector byte index 436 positions 12 to 15 (in big-endian numbering counting from the most significant bit), where all data words are allocated to align their least significant bit with the least significant bit of the data word.

In accordance with the exemplary description of the embodiment based on the data layout of FIG. 4C, preferred slot 434 is allocated to byte slots 12 to 15. By allocating the data to bytes 12 to 15, no data transfer is necessary for any and all integer data type conversions.

In an illustrative embodiment of data alignment, a compiler generates code to convert a memory address 448 to a data re-alignment parameter to be used in conjunction with a shift or rotate count to be interpreted modulo the vector length (i.e., ignoring the high-order bits of the address). In accordance with this embodiment, alignment of data within preferred slot 434 requires computing a rotate or shift amount distinct from the low-order address bits. In accordance with this embodiment, the following re-alignment factors, shown in Table 2, may be used in conjunction with rotate instructions interpreting their rotate argument to specify a byte rotate amount, where the integral data types are aligned with respect to their object's natural alignment and where the objects address is indicated by the variable "A". This occurs when a vector has been loaded with a load instruction retrieving an aligned vector object containing the specified address (i.e., by truncating the low order address bits of "A" to force vector alignment).

TABLE 2

| Object size | Rotate vector left by |
|---|---|
| Byte 438 | 15 – A |
| Halfword 440 | 14 – A |
| Word 442 | 12 – A |
| Doubleword 444 | 8 – A |
| Quadword 446 | Aligned with respect to vector |

While the values specified above have been specified as a rotate left count, those skilled in the art will understand that the values may also be used in conjunction with a shift left instruction interpreting a truncated signed count as shift right, or suitably adjusted (by inverting the signs on the re-alignment values, i.e., alignment factor "12-A" becoming "A-12") as a parameter to a shift right or rotate right instruction.

Referring now to the alignment of addresses, predicates (condition values), and other types not shown, these data types are preferably aligned in accordance with their object size, such as, when an address is represented by a word, it is aligned at a word boundary, when a predicate is represented by one of a byte, halfword and word it is preferably re-aligned in accordance with the byte, halfword, and word re-alignment factors, respectively.

When a data element is to be stored, it is preferably realigned within a vector to its target position in memory with respect to the vector boundaries. In one embodiment, this is accomplished by one of shifting or rotating the value left by the value indicated for load. In one embodiment, this is expressed by the use of a specific rotate right or shift right instruction. In another embodiment, a rotate takes a byte rotate parameter modulo the vector size, and the rotate value is indicated by one of inverting the sign of the realignment factor, and subtracting the realignment factor from the size of the vector (in bytes). Those skilled in the art will understand other methods to compute suitable alignment values based on mathematical transformations taking into account specific properties of vector length, instruction parameter interpretation, and so forth.

Referring now to data storage, a number of sequences are possible. In accordance with one embodiment, a sequence based on sub-vector storage with respect to a full vector may be used. In accordance with another embodiment, a full line may be loaded, a merge may be performed, and the full line may be stored. Loading and storing a full line in conjunction with data merge has preferable memory interface simplification properties for the implementation of a processor being targeted by the illustrative embodiments, but requires special attention to memory update sequencing in a multithreaded environment when multiple threads may update sub vector data within the confines of a single aligned memory unit corresponding to the size of a vector register.

While this description, and the alignment factors have been specified with respect to a specific slot use for specific data elements as shown in FIG. 4C, those skilled in the art will understand that the realignment factors herein specified may be modified to select any combination of other slots.

Referring now to the alignment of basic data types with respect to their position in memory, and with respect to a computation slot, a preferred target architecture offers at least one rotate or shift instruction allowing to specify a byte shift or rotate parameter, specified in the preferred slot, further interpreting the parameter as being specified modulo the size of the vector register in bytes. In one illustrative embodiment, a byte rotate instruction "rotate quadword by bytes" is generated by a compiler in accordance with the illustrative embodiments to re-align a word specified by address ra and loaded into a register rm with a loadquad instruction, the word being realigned into a target register rt:

| lqd    | rm, 0(ra)  |
| subf   | rb, ra, 12 |
| rotqby | rt, rm, rb |

Referring now to data load and realignment of a byte type for a slot assignment in accordance with FIG. 4A, the following sequence represents a illustrative implementation:

| lqd    | rm, 0(ra)  |
| subf   | rb, ra, 15 |
| rotqby | rt, rm, rb |

In one alternate embodiment, special instruction forms are supplied to include the modification of alignment arguments, that is, the subtraction of the byte offsets (12, 15 and so forth) within a vector register file for load data realignment, or the modification of re-alignment factors for store re-alignment and merge. In such an embodiment, the exemplary load byte sequence shown hereinabove may be modified to eliminate the adjustment of the byte address, and use a sequence consisting of the first lqd followed by the specialized rotate form.

Those skilled in the art will understand that rotate and shift instructions as lined out hereinabove will align scalar subword types within their respective target locations, but not leave bytes in remaining bytes of a word computation slot undefined (typically corresponding to memory contents in words surrounding the desired word). When subword data types are to be used in word computations, bytes and halfword must be one of zero-extended and sign-extended to a full word. In one embodiment, zero-extension is accomplished by performing a logical AND with constants 0xff, and 0xffff, for bytes and half words, respectively. In accordance with one illustrative embodiment, the compiler generates code to perform zero-extension using a logical AND operation with the constants to zero-extend a scalar subword data type stored within a vector register. Those skilled in the art will understand that zero-extension may be alternatively be achieved with a specific zero-extending instruction, and a compiler, in accordance with the illustrative embodiments, will use a zero-extend subword type to word instruction if a novel vector element form of this instruction is provided, where such extension occurs within at least one slot of a vector operation.

In another embodiment, zero-extension is performed with a shift (or rotate, or other instruction as provided by the instruction set) to the most significant position in the target vector element, followed by a logical shift right by 3 and 2 bytes (for bytes and halfwords, respectively) to the desired target position. In accordance with the illustrative embodiments, the compiler generates-code to perform such sequences.

Now specifically referring to zero-extending a byte, using a dual-shift sequence in accordance with one illustrative embodiment, the compiler generates a byte rotate instruction "rotate quadword by bytes" to re-align a word to the most significant position, specified by address ra and loaded into a register rm with a loadquad instruction, the word being realigned into a target register rt. It then generates a vector element shift right (indicated by a vector element shift left immediate with negative shift count) to align within the preferred slot and force the high order bits to zero:

| lqd    | rm, 0(ra)   |
| subf   | rb, ra, 12  |
| rotqby | rt, rm, rb  |
| shli   | rt, rt, −24 |

Those skilled in the art will understand that the bit shift count used for the shift instruction corresponds to the address adjustment previously specified hereinabove. Those skilled in the art will appreciate that, in this example, the shift count is expressed as bits using the specific instruction form, where for the exemplary code sequence corresponding to byte realignment with zero-extension within a word, a shift factor 24 bits corresponds to 3 bytes. Those skilled in the art will also appreciate that whereas separate instruction forms for rotate/shift by bytes and shift by bits are necessary for register specified quadword forms to allow efficient re-alignment, this is not necessary for shifts by constant. Whereas variable byte addresses have to be translated to bit offsets using a code generation method generation additional instructions and thus causing performance degradation in the generated code, a code generation method to translate a constant byte offset to a constant bit offset does not incur a code performance penalty for the generated code.

Referring now to sign-extension, in one embodiment, sign-extension may be achieved with a specific sign-extending instruction, and a compiler, in accordance with the illustrative embodiments, will use a sign-extend subword type to word instruction if a novel vector element form of this instruction is provided, where such extension occurs within at least one slot of a vector operation.

In another embodiment, sign-extension is performed with a shift (or rotate, or other instruction as provided by the instruction set) to the most significant position in the target vector word element slot, followed by an arithmetic (i.e., sign-extending) shift right by 3 and 2 bytes (for bytes and halfwords, respectively) to the desired target position. In accordance with the illustrative embodiments, the compiler generates code to perform such sequences.

Now specifically referring to zero-extending a byte, using a dual-shift sequence in accordance with one illustrative embodiment, the compiler generates a byte rotate instruction "rotate quadword by bytes" to re-align a word to the most significant position, specified by address ra and loaded into a register rm with a loadquad instruction, the word being realigned into a target register rt. It then generates a vector element arithmetic shift right (indicated by a vector element shift left immediate with negative shift count) to align within the preferred slot and force the high order bits to be a replica of the sign bit:

| | |
|---|---|
| lqd | rm, 0(ra) |
| subf | rb, ra, 12 |
| rotqby | rt, rm, rb |
| ashli | rt, rt, −24 |

Those skilled in the art will understand that the bit shift count used for the shift instruction corresponds to the address adjustment previously specified hereinabove. Those skilled in the art will appreciate that in this example, the shift count is expressed as bits using the specific instruction form, where for the exemplary code sequence corresponding to byte realignment with zero-extension within a word, a shift factor 24 bits corresponds to 3 bytes. Those skilled in the art will also appreciate that whereas separate instruction forms for rotate/shift by bytes and shift by bits are necessary for register specified quadword forms to allow efficient re-alignment, this is not necessary for shifts by constant. Whereas variable byte addresses have to be translated to bit offsets using a code generation method generation additional instructions and thus causing performance degradation in the generated code, a code generation method to translate a constant byte offset to a constant bit offset does not incur a code performance penalty for the generated code.

In another embodiment of a SIMD RISC architecture in accordance with the illustrative embodiments, there are provided novel rotate and mask instructions where a quadword rotate across a vector is performed, followed by one of a zero and a sign-extension in at least one slot, such that a subword data element being aligned is appropriately zero- or sign-extended during the rotate process. In one illustrative embodiment, the compiler generates code utilizing at least one of the novel rotate and mask vector element instructions.

Referring now to sign and zero-extension of subword data types to word data types, the same code sequences and methods for generating them may be used as described for use in conjunction with the data layouts of FIG. 4A.

Referring now to sign and zero-extension of word types to superword types, methods similar to those described for use in conjunction with FIG. 4A may be used, but omitting the step of rotating the low order data types to a new position, i.e., the steps required generally consist of generating at least one byte having the desired extension (zeros, or replicas of the sign bit), and then generating logical operations, permutes, and optionally other appropriate instructions, to set the extended bytes to the value.

Data type truncation may be achieved for all possible conversions by ignoring high order bytes, and using the wide data type as short data type in code generated by the compiler.

In yet another embodiment, another slot is used as preferred slot, or the alignment of data subwords and superwords with respect to a slot is modified. While the descriptions contained herein generally refer to embodiments with a vector register of size 128 bit, a word size of 32 bit, a byte size of 8 bit, and addresses having 32 bit, other embodiments are possible, and those skilled in the art will understand how to use the teachings contained herein to systems with other data sizes.

Figure 5:
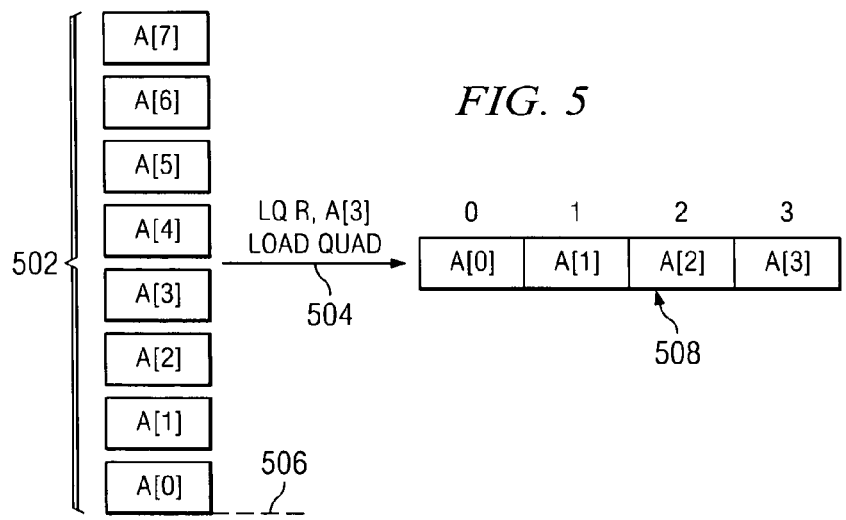
FIG. 5 depicts the operation of the load/store unit in accordance with an illustrative embodiment.

FIG. 5 depicts the operation of the load/store unit in accordance with an illustrative embodiment. In this operation, there is shown the operation of the "load quadword" instruction. A load instruction retrieves a number of bytes 502 commensurate with the vector size 504, starting at alignment boundary 506, and including the specified address. Assuming a 128 bit aligned array boundary A[0] with a 4 byte element size, a load quadword instruction from address A[3] will retrieve data from an aligned address at or below the specified address to include at least the byte specified by the supplied operand address in to vector register file 508.

Figure 6A:
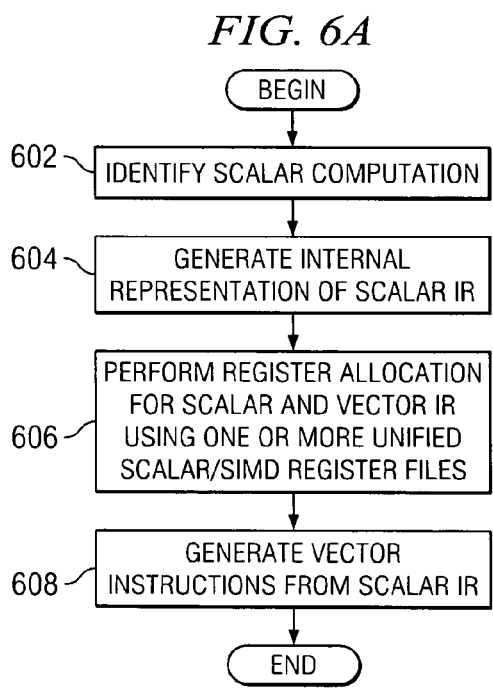
FIG. 6A depicts a flowchart for compiling scalar computation code to a SIMD RISC architecture to generate code directed at executing the scalar operations on data-parallel (vector) computation data paths, based on representing in an internal representation (IR) scalar operations with IR operation forms distinct from IR vector operation forms in accordance with an illustrative embodiment.

FIG. 6A depicts a flowchart for compiling scalar computation code to a SIMD RISC architecture to generate code directed at executing the scalar operations on data-parallel (vector) computation data paths, based on representing in an internal representation (IR) scalar operations with IR operation forms distinct from IR vector operation forms in accordance with an illustrative embodiment. The operation described in FIG. 6A may be performed by a compiler and the compiler may be either static or dynamic.

As the operation begins, a scalar computation is identified (step 602). A compiler internal representation of the scalar computation is generated based on distinct scalar IR operation forms (step 604). Register allocation for scalar and vector IR expressions is performed on the internal program representation using one or more unified scalar/SIMD register files, such as, vector register file used for storing both scalar and SIMD data (step 606). Finally, vector machine instructions are generated from the scalar IR (step 608), with the operation ending thereafter.

In accordance with this embodiment, vector and scalar IR forms reference the same symbolic unified register files to supply both scalar and vector data operands. In an illustrative embodiment, register allocation is performed on scalar and vector words within a compilation unit concurrently. In an alternate illustrative embodiment, a first set of operands are allocated (e.g., one of scalar operands and vector operands), followed by separate allocation of a second set (e.g., one of vector operands and scalar operands).

In one embodiment, indicators are provided to indicate the vector instruction being executed in scalar mode, i.e., where only a portion of the scalar vector word will be used as input operand to instructions, to facilitate hardware optimizations such as providing a low power mode to a portion of the data-parallel vector datapath.

Figure 6B:
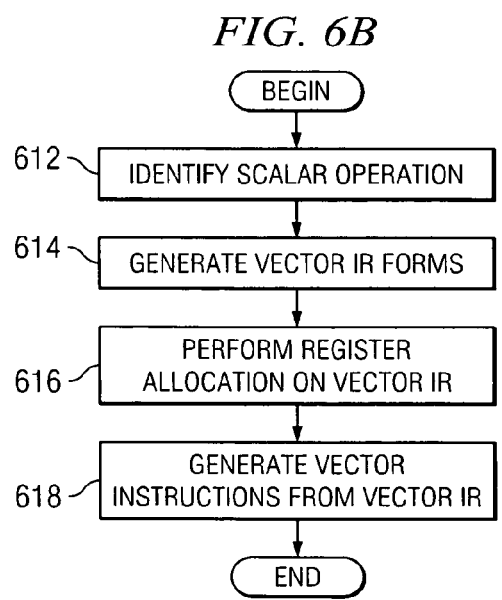
FIG. 6B depicts a flowchart for compiling scalar computation code to a SIMD RISC architecture to generate code directed at executing the scalar operations on data-parallel (vector) computation data paths, based on representing in an internal representation (IR) scalar operations and vector IR forms with a common operation form reflective of the vector semantics in accordance with an illustrative embodiment.

FIG. 6B depicts a flowchart for compiling scalar computation code to a SIMD RISC architecture to generate code directed at executing the scalar operations on data-parallel (vector) computation data paths, based on representing in an internal representation (IR) scalar operations and vector IR forms with a common operation form reflective of the vector semantics in accordance with an illustrative embodiment. The operation described in FIG. 6B may be performed by a compiler and the compiler may be either static or dynamic.

As the operation begins, a scalar computation is identified (step 612). A compiler internal representation is generated of the scalar computation based on IR operation forms reflecting the vector semantics of the target instruction set (step 614). Register allocation for IR expressions is performed on the internal program representation using one or more unified scalar/SIMD register files, such as, vector register file used for storing both scalar and SIMD data in accordance with the illustrative embodiment (step 616). Then vector machine instructions are generated from the vector IR (step 618), with the operation ending thereafter.

In accordance with the operation described in FIG. 6B, the operation is applied directly to a program input representation. In accordance with another use of the operation described in FIG. 6B, the operation is applied to read a first internal representation (IR) reflective of the scalar computation nature, and generating the second form reflective of the full vector semantics. In one embodiment, the specification of the internal representation is common to the first and second representations. In another embodiment, different IR forms, optimized for different compiler phases, are used.

In accordance with an illustrative embodiment, all IR forms reference a common vector register set, regardless of their use for representing scalar or vector operations.

In one embodiment, indicators are provided to indicate the vector instruction being executed in scalar mode, i.e., where only a portion of the scalar vector word will be used as input operand to instructions, to facilitate hardware optimizations such as providing a low power mode to a portion of the data-parallel vector datapath.

An illustrative embodiment, also including automatic vectorization, will prefer to use the operation described in FIG. 6A, and express scalar operations at a high level, before autovectorization is performed, to preserve a maximum of context for a SIMDization pass. After SIMDization, an IR lowering step will be performed. One such lowering step may be in accordance with the operation described in FIG. 7. In another embodiment, all scalar IR will be converted to vector IR after a SIMDization pass. In other embodiments, the operation described in FIG. 6B is used in conjunction with SIMDization.

Figure 7:
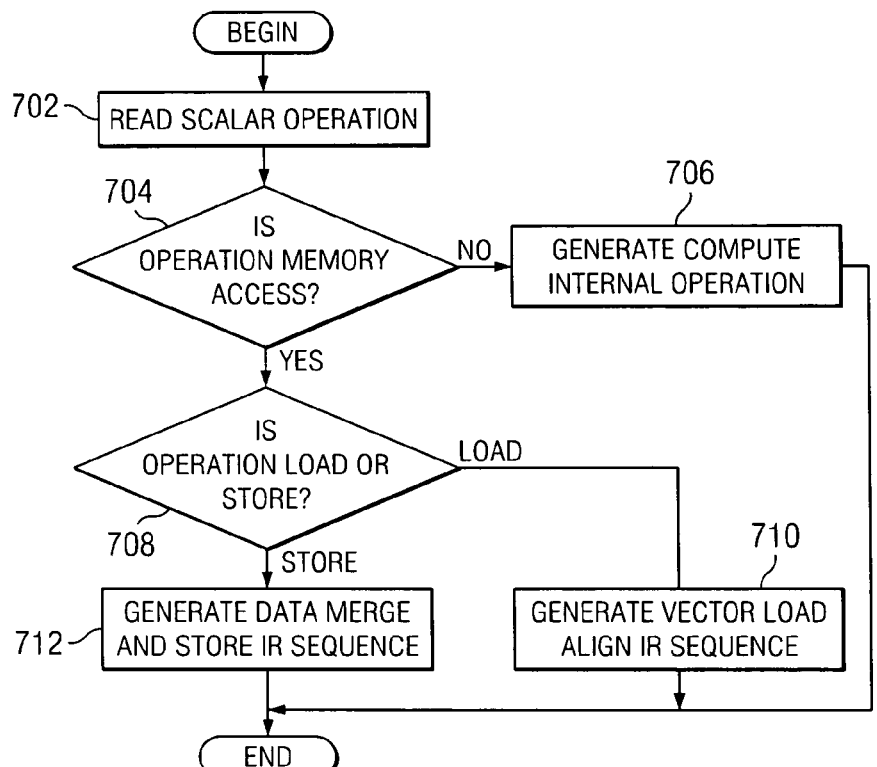
FIG. 7 depicts a flowchart of translation of a specific scalar operation into a detailed internal representation format in accordance with an illustrative embodiment.

FIG. 7 depicts a flowchart of translation of a specific scalar operation into a detailed internal representation format in accordance with an illustrative embodiment. The operation described in FIG. 7 may be performed by a compiler and the compiler may be either static or dynamic. As the operation begins, a scalar operation is read (step 702). A determination is performed as to whether the operation corresponds to the memory access (step 704). If the test indicates the scalar operation does not correspond to a memory access, an internal representation form of the scalar operation not corresponding to a memory instruction is generated (step 706), with the operation ending thereafter.

If at step 704, the scalar operation corresponds to a memory operation, a determination is made as to whether the memory operation corresponds to a load or a store operation (step 708). If the memory operation corresponds to a load operation, a vector load and align sequence corresponding to the scalar load operation in the internal representation format is generated (step 710), with the operation ending thereafter. If at step 708, the memory operation corresponds to a store operation, a data merge and store sequence corresponding to the scalar store operation in the internal representation format is generated (step 712), with the operation ending thereafter.

Exemplary assembly codes corresponding to code generated in response to IR code generated by steps 710 and 712 are described in conjunction with FIGS. 4A, 4B and 4C.

In accordance with the operation described in FIG. 7, the operation is applied directly to a program input representation. In accordance with another use of the operation described in FIG. 7, the operation is applied to read a first internal representation (IR) reflective of the scalar computation nature, and generating the second form reflective of the full vector semantics. In one embodiment, the specification of the internal representation is common to the first and second representations. In another embodiment, different IR forms, optimized for different compiler phases, are used.

Referring now to the generation of alignment code, in one embodiment all computation is performed in a predefined computation slot. In accordance with this embodiment, data are aligned to the computation slot using one or more alignment instructions. A variety of instructions may be used to achieve alignment, such as including, but not limited to, rotate instructions, shift instructions, or permute instructions.

When generating code for some alignment sequences to dynamically align data under software control, the realignment amount may be statically determined when the address, or a sufficient number of low-order bits of the address, are known. In embodiments where the full address cannot be known, low-order data bits may be determined, by guaranteeing a minimum alignment for key parameters such as stack and frame pointers, or the beginning of a data segment, and modifying the address by adding a known amount, a known multiple of an unknown amount, and so forth.

When generating code for some alignment sequences, the realignment amount cannot be statically determined, and additional code is generated to dynamically compute the realignment amount at runtime, and use the dynamically computed realignment amount to dynamically align data under software control.

Figure 8A:
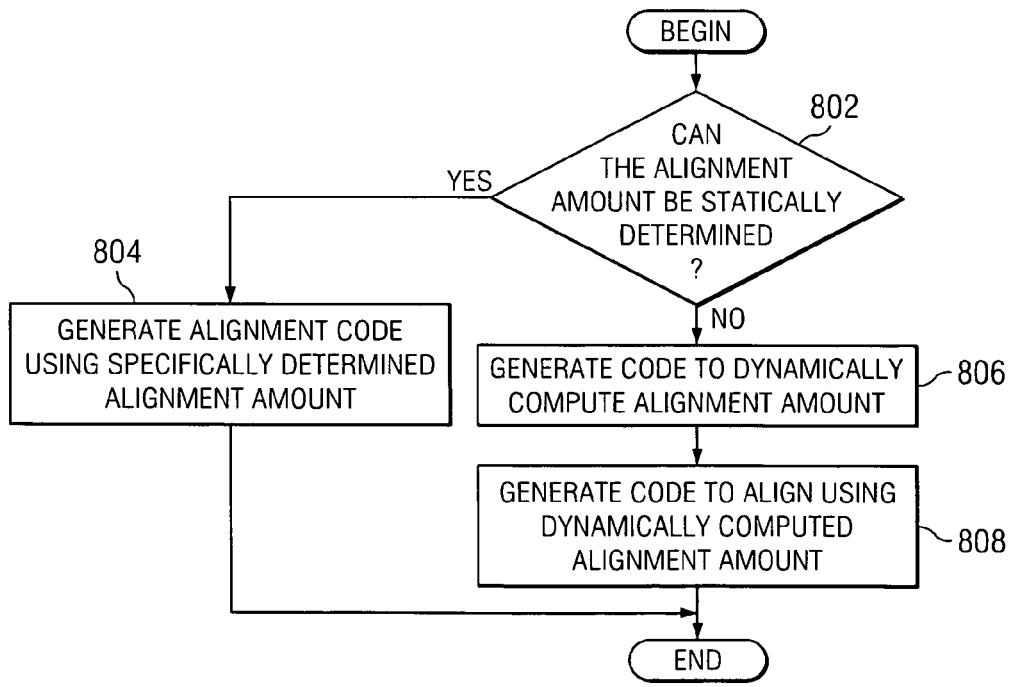
FIG. 8A depicts a flowchart for generating alignment code in accordance with an illustrative embodiment.

FIG. 8A depicts a flowchart for generating alignment code in accordance with an illustrative embodiment. The operation described in FIG. 8A may be performed by a compiler and the compiler may be either static or dynamic. As the operation begins, a determination is made as to whether the alignment amount may be statically determined at compile time, either because the address may be completely derived, or a sufficient number of low-order bits may be derived (step 802). If static determination is successful, alignment code is generated to dynamically realign scalar data under software control using the statically determined alignment amount (step 804), with the operation ending thereafter. If static determination is not possible, code is generated to dynamically compute the alignment amount and store the result in at least one storage element, preferably a register (step 806). Code is then generated to dynamically realign data under software control in accordance with the illustrative embodiment using the result computed by the code generated in step 806 (step 808), with the operation ending thereafter.

Those skilled in the art will understand that in lieu of generating code, internal representation pseudocode may be generated and injected into the program to be further optimized before actual code generation following the teachings of the illustrative embodiments.

FIG. 8B depicts a flowchart for generating and optimizing realignment code in accordance with an illustrative embodiment. The operation described in FIG. 8B may be performed by a compiler and the compiler may be either static or dynamic. As the operation begins, IR pseudocode is generated representing the computation of the realignment amount (step 812). The generated IR is then injected into the IR-based program representation used by the compiler (step 814). Optimizations are then performed on the IR, optimizing the IR sequence generating the realignment amount, using such techniques as constant propagation, constant folding and symbolic transformations (step 816). In at least one embodiment, special optimizations are performed to determine properties of variables (i.e., multiples of a value, and so forth) which allow optimization of alignment code generation even if a constant value cannot be derived. As a final step, code is generated from the IR program representation (step 818), with the operation ending thereafter. FIGS. 8A and 8B correspond to possible implementations of an alignment computation substep of steps 710 and 712 described in FIG. 7.

FIG. 9A depicts exemplary application code 900 in accordance with an illustrative embodiment. FIG. 9B depicts exemplary symbol information 910 and intermediate representation 912 in accordance with an illustrative embodiment. Symbol information 910 and intermediate representation 912 correspond to the execution result of one exemplary implementation of the operation described in FIG. 6A on exemplary application code 900 of FIG. 9A, and includes the operation described in FIG. 7 to translate scalar accesses into load and align sequences so presented in the intermediate representation.

Figure 9D:
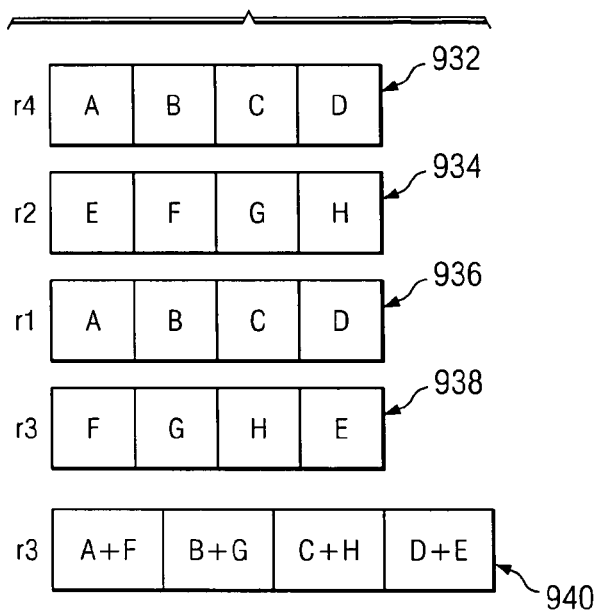
FIG. 9D depicts the exemplary results of the program having been compiled in accordance with an illustrative embodiment.

FIG. 9C depicts machine code generated from intermediate representation 912 of FIG. 9B in accordance with an illustrative embodiment. Specifically, a first load quadword instruction 920, loading a number of bytes starting at an aligned address generated from an unaligned address of the variable "a" of FIG. 9A, the aligned address generated in accordance with the specification of the Synergistic Processor Unit (SPU) instruction "lqd", to comprise the word storing "a", into a wide register R4. In addition to variable "a", other data is loaded, which is not specified by the program, and does not represent useful data for the purpose of computing result "r" 905 of FIG. 9A. Specifically, the excess data being so loaded is the result of internal compiler decisions, and dependent on a specific compiler and not readily discernable by analysis of the program source code. FIG. 9D depicts the exemplary results of the program having been compiled in accordance with an illustrative embodiment. The exemplary result being loaded as a result of instruction 920 of FIG. 9C is shown as the contents of register R4 932 of FIG. 9D.

Returning now to FIG. 9C, there is shown a second load quadword instruction 922, loading a number of bytes starting at an aligned address generated from an unaligned address of the variable "f" of FIG. 9A, into a wide register R2. In addition to variable "f", other data is loaded, which is not specified by the program, and does not represent useful data for the purpose of computing result "r" 905 of FIG. 9A. Specifically, the excess data being so loaded is the result of internal compiler decisions, and dependent on a specific compiler and not readily discernable by analysis of the program source code. An exemplary result being so loaded is shown as the contents of wide register R2 934 in FIG. 9D.

Referring now to instructions with numerals 924 and 926 in FIG. 9C, corresponding to instructions to dynamically perform data alignment under control of addresses stored in preferred slots of registers "rA" and "rF", corresponding to dynamically aligning variables "a" and "f" into a leftmost computation slot of wide registers R1 and R3, which are indicated by numerals 936 and 938 of FIG. 9D, respectively. The instructions having been generated in accordance with step 808 of FIG. 8A, and generally corresponding to code sequences generated in response to FIG. 7, in accordance with data re-alignment rules and exemplary code sequences previously described in conjunction with preferred data layouts in FIG. 4A.

There is furthermore shown a computational vector SIMD operation FA indicated by reference numeral 928 in FIG. 9C, generating a result "r" 905 of FIG. 9A in a first slot of a vector register R3 940 of FIG. 9D, and additional excess results corresponding to the operation specified by the vector instruction being performed on unspecified excess data having been loaded by load quadword instructions 920 and 922, and dynamic realignment instructions 924 and 926, and being so present in vector registers R1 and R3.

The result is stored in the preferred slot of wide register R3, being so specified as the return register for function return values in accordance with one exemplary application binary interface (ABI) specification for one exemplary SIMD RISC processor.

Referring now to instruction 930 in FIG. 9C, a "branch indirect" ("bi") to register r0 is provided to provide a return from subroutine. In accordance with one exemplary specification of a SIMD RISC architecture, branch indirect instructions branch to an address specified in a preferred slot of a wide register. In accordance with an exemplary ABI of one SIMD RISC architecture, the function return address is stored in the preferred slot of register R0, where it has been previously deposited by a "branch and link" instruction taking a general register as link target in an exemplary SIMD RISC architecture, and having specified R0 in accordance with one exemplary ABI.

Those skilled in the art will further appreciate that in the exemplary code sequence of FIG. 9B, there is an assumption of natural alignment of scalar values with respect to their data types, and hence obviating the need to deal with instructions straddling aligned vector register boundaries. Those skilled in the art will further appreciate how to apply the teachings set forth herein to application environments where natural alignment of scalar data is not provided, in accordance with the specification of a SIMD RISC architecture, and general programming principles.

Having set forth a preferred program sequence for the dynamic alignment of scalar data in a vector register with the exemplary "rotqby" SIMD RISC instruction under the control of dynamic alignment information (the information being provided by low-order bits of an address stored in a preferred slot of a wide register). Those skilled in the art will appreciate the use of a rotate quadword by bytes immediate "rotqbyi" instruction as a preferred embodiment of alignment for statically determined alignment information, the instruction advantageously allowing the encoding of an immediate.

Referring now to an illustrative embodiment of performing scalar layering, i.e., implementing scalar computations on a data-parallel execution engine, there is provided a method to automatically SIMDize portions of scalar code under compiler control to better exploit data-level parallelism.

Figure 10:
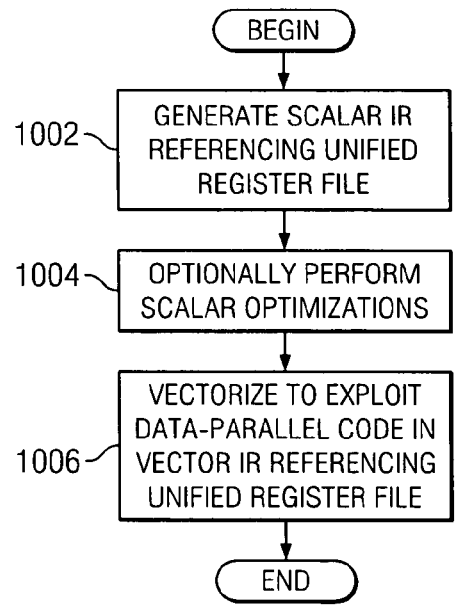
FIG. 10 depicts a flow diagram of integrating auto-vectorization for SIMD instruction sets in accordance with an illustrative embodiment.

FIG. 10 depicts a flow diagram of integrating auto-vectorization for SIMD instruction sets in accordance with an illustrative embodiment. The operation described in FIG. 10 may be performed by a compiler and the compiler may be either static or dynamic. As the operation begins, a scalar IR is generated, preferably referencing values in a unified register file using symbolic register names, but abstracting details of scalar layering (step 1002). Then, optionally, at least one scalar optimization is performed on the scalar IR (step 1004). The scalar IR is then vectorized to exploit data-parallel code, generating vector IR referencing the unified register file, preferably using symbolic names (step 1006), with the operation ending thereafter.

In one preferred embodiment, the operation described in FIG. 10 is followed by the operation described in FIG. 7 to perform lowering of the IR form, which has been deferred until after vectorization in order to avoid data alignment operations reflective of scalar computation from being a hindrance during the vectorization process.

In accordance with one such compilation sequence, additional compilation steps executed after SIMDization may include, but are not limited to: IR lowering, data layout optimization, alignment analysis, register allocation, spill code optimization, and subword computation optimization.

Referring now to data layout optimization and selecting a vector slot for computation, in one embodiment a predetermined vector slot is used for all scalar computations. In another optimized embodiment, the computation slot is dynamically determined by the compiler to reduce and/or minimize the cost of data alignment. In accordance with yet another embodiment, variable allocation is performed in conjunction with computation slot determination to further reduce the cost of data re-alignment.

Figure 11A:
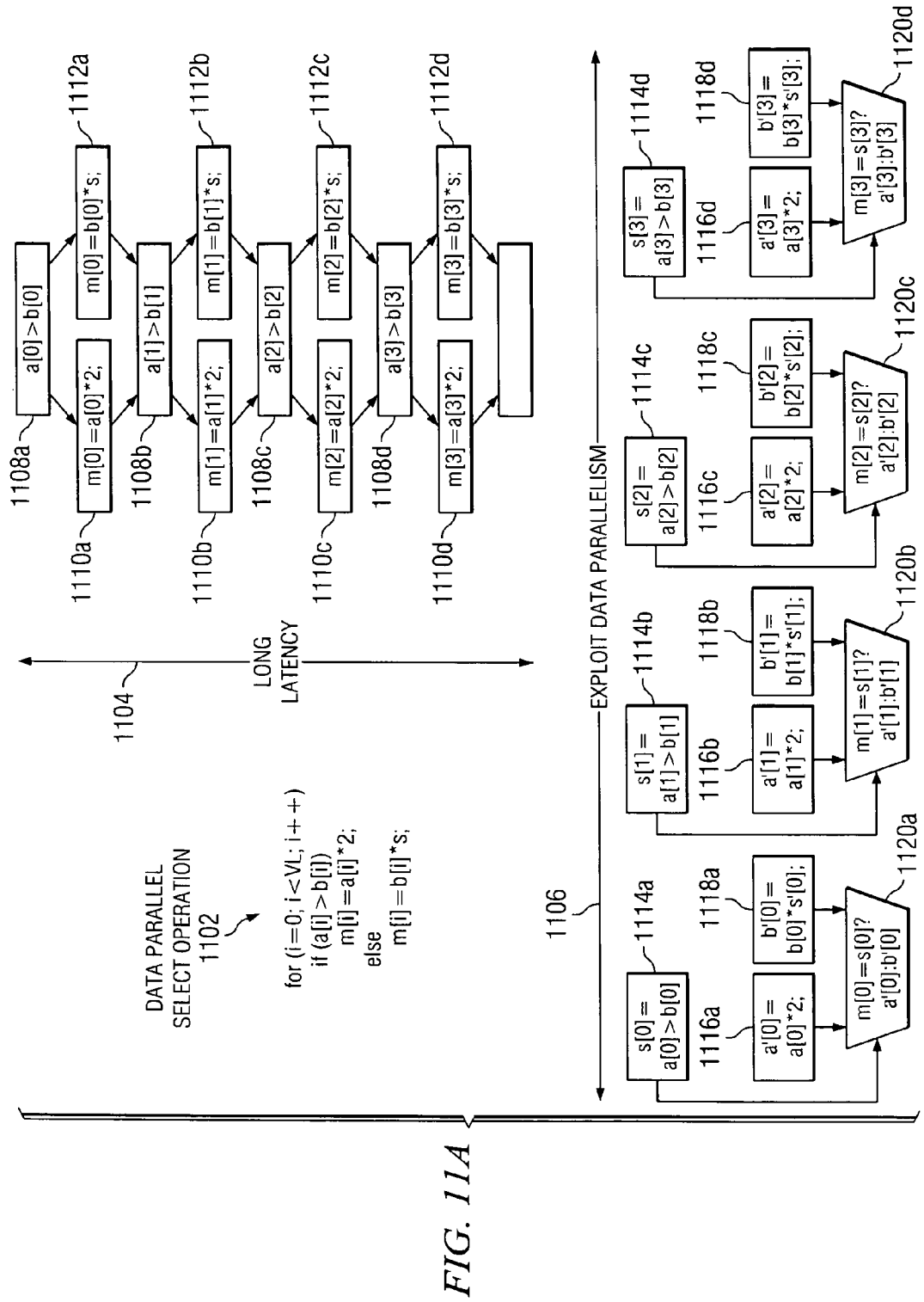
FIG. 11A depicts an exemplary source code sequence, a first scalar control-dominated implementation, and a second data-parallel implementation exploiting data parallel select in accordance with an illustrative embodiment.

FIG. 11A depicts an exemplary source code sequence 1102, a first scalar control-dominated implementation 1104, and a second data-parallel implementation 1106 exploiting data parallel select in accordance with an illustrative embodiment. There is also shown the efficient sharing of scalar results with vector computation as is facilitated by the use of a unified scalar/SIMD register file in SIMD RISC architectures in accordance with the illustrative embodiments.

In accordance with the exemplary source code sequence 1102, there is performed for each vector element of two vectors a test, and one of two possible outcomes selected based on determination of the test.

In accordance with a first implementation, not including vectorization of code, and not using a select facility, a control-dominated sequence 1104 is generated where a condition is tested and a conditional branch is performed, test and branch generally indicated by numerals 1108a, b, c, and d, to one of two basic blocks 1110a, b, c, and d and 1112a, b, c, and d.

Because branches are inherently scalar, i.e., they map a single condition to a range of possible PC values, vectorization is not possible. Additionally, the branches shown are highly data-dependent making them prone to high misprediction, resulting in increased code latency due to branch misprediction penalties incurred, and particularly to for efficient simple control architectures exploiting static branch prediction.

In accordance with a preferred code generation approach, data parallelism is exploited with respect to the computation of vector elements, and by converting control-flow dominated data-selection to per-vector-element data selection based on a data-parallel select operation provided in one exemplary SIMD RISC architecture.

Referring now to data-parallel code schema 1106, there is shown the data-parallel execution of a selection condition, 1114a, b, c, and d corresponding to the data-parallel computation in 4 slots respectively, the computation of a first possible result corresponding to a first path through a code 1116a, b, c, and d corresponding to the data-parallel computation in 4 slots respectively, the computation of a second possible result corresponding to a path through a code 1118a, b, c, and d corresponding to the data-parallel computation in 4 slots respectively, and the independent selection of one of the two possible results under control of the data-parallel condition 1120a, b, c, and d corresponding to the data-parallel, independent selection in 4 slots respectively.

FIG. 11B depicts code corresponding to code schema 1102 of FIG. 11A for an exemplary SIMD RISC architecture in accordance with an illustrative embodiment. In accordance with this exemplary code 1122, the preferred slot of register r100 contains the based address for array a[ ], the preferred slot of register r101 contains the base address for array b[ ], and the preferred slot of register 102 contains the base address of array m[ ]. Furthermore, a scalar s is provided in the preferred slot of register r3.

In accordance with one exemplary implementation of code 1122, scalar s is converted to a vector, under the use of the "shuffle bytes" instruction, and specifically using a control word indicating such replication, the control word having been loaded into all 4 slots with the immediate load address (ila) instruction. A second single precision floating point vector containing 4 copies of the constant 2.0 encoded as floating point number is loaded from the constant pool.

Those skilled in the art will appreciate the operation of the vector code, understanding that scalar data maintained in the preferred slot of register r1, for the loop index, and r100, r101, and r102, for the array base addresses, are used to provide memory addresses and loop control.

Those skilled in the art will further understand that branch prediction hints may be inserted, loops may be unrolled, and instructions may be scheduled more aggressively, and so forth, within the scope of the illustrative embodiments.

FIG. 12 depicts a flowchart of the implementation of an improved selection of a computation slot in accordance with an illustrative embodiment. The operation described in FIG. 12 may be performed by a compiler and the compiler may be either static or dynamic. As the operation begins, a data flow graph is built for scalar data having been selected to be processed in a SIMD vector execution unit (step 1202). The data flow graph is annotated with the alignment for scalar inputs (leaves) and outputs (roots) of scalar computations performed in a SIMD vector execution unit, when those alignments may be statically derived (step 1204). Computation slots for internal nodes are then derived by propagating alignment information along graph edges (step 1206). Then, optionally, variables are allocated based on desirable computational slots is performed to further reduce alignment cost and described herein below (step 1208), with the operation ending thereafter.

While the use of alignment policies in conjunction with compiling scalar applications to exploit SIMD execution units has been impossible in accordance with prior art, the illustrative embodiment allows to adopt alignment policies for this purpose. A number of methods for deriving preferred alignment by propagating and resolving alignment conflicts have been described in other contexts, but not useable with the novel scalar compilation methods.

In accordance with the illustrative embodiments, offering suitable representation and algorithms for compiling scalar code for execution on the SIMD execution engines, alignment policies may be applied.

In accordance with one embodiment, a "lazy align" policy is adopted similar to alignment optimization performed during auto-vectorization. While the preexisting methods may be used to improve alignment assignment, it is another object of the illustrative embodiments to further reduce the cost of dynamic alignment.

Referring now to optional step 1208, in one embodiment, leaf nodes (representing scalar inputs) with as yet unassigned alignment constraints, may be allocated to a desirable alignment slot chosen to minimize alignment cost. In a lazy alignment policy, the selected alignment slot for data is based on that of other inputs to the first operator. In a "dominant align" policy, alignment occurs to the dominant alignment.

Because a variable may be the input to multiple data dependence graphs, an alignment is best chosen heuristically by prioritizing graphs with higher loop nest depth. We conjecture that optimal alignment assignment is NP complete. In one embodiment, an additional packing step is performed, where variables with non-conflicting alignment are co-allocated to increase memory efficiency. (i.e., a scalar value with a required alignment of vector alignment +4 bytes, and a scalar value with a required alignment of vector alignment +8 bytes may be co-allocated to a memory space corresponding to a vector register, if the first scalar value requires no more than 4 bytes, even if the values are "live" at the same time).

In another embodiment, simplified allocation strategy optimized for a fixed desirable computation slot, all scalar variables are allocated at a vector boundary offset corresponding to the fixed desirable computation slot.

Referring now to the optimization of spill code (e.g., including, but not limited to, at function call sites), in one embodiment, each vector register to be spilled may be allocated a spill area corresponding to the vector register to reduce the cost of storing spilled subvector data.

In another embodiment optimized to reduce the cost of subvector data spills, yet reduce memory area and memory bandwidth consumption, an aligned spill area (preferably both starting and ending at memory addresses corresponding to a vector alignment boundary) is allocated and subvector spill data are packed with other, simultaneously spilled using data packing instructions (such as an exemplary SIMD RISC "shufb" shuffle byte instructions, or other vector packing instructions). In accordance with this optimization, the number of bytes stored, the density in a stack frame, and the number of entries needed to store the spilled data in a store queue, are minimized. Because data may be packed at the rate of at least one data item merged per instruction, the overall number of instructions remains constant, and there is no increase in necessary instruction fetch or processing bandwidth. If address generation is necessary for computing spill area addresses, the pack and store approach may also result in a reduce number of instructions to be executed.

Figure 13B:
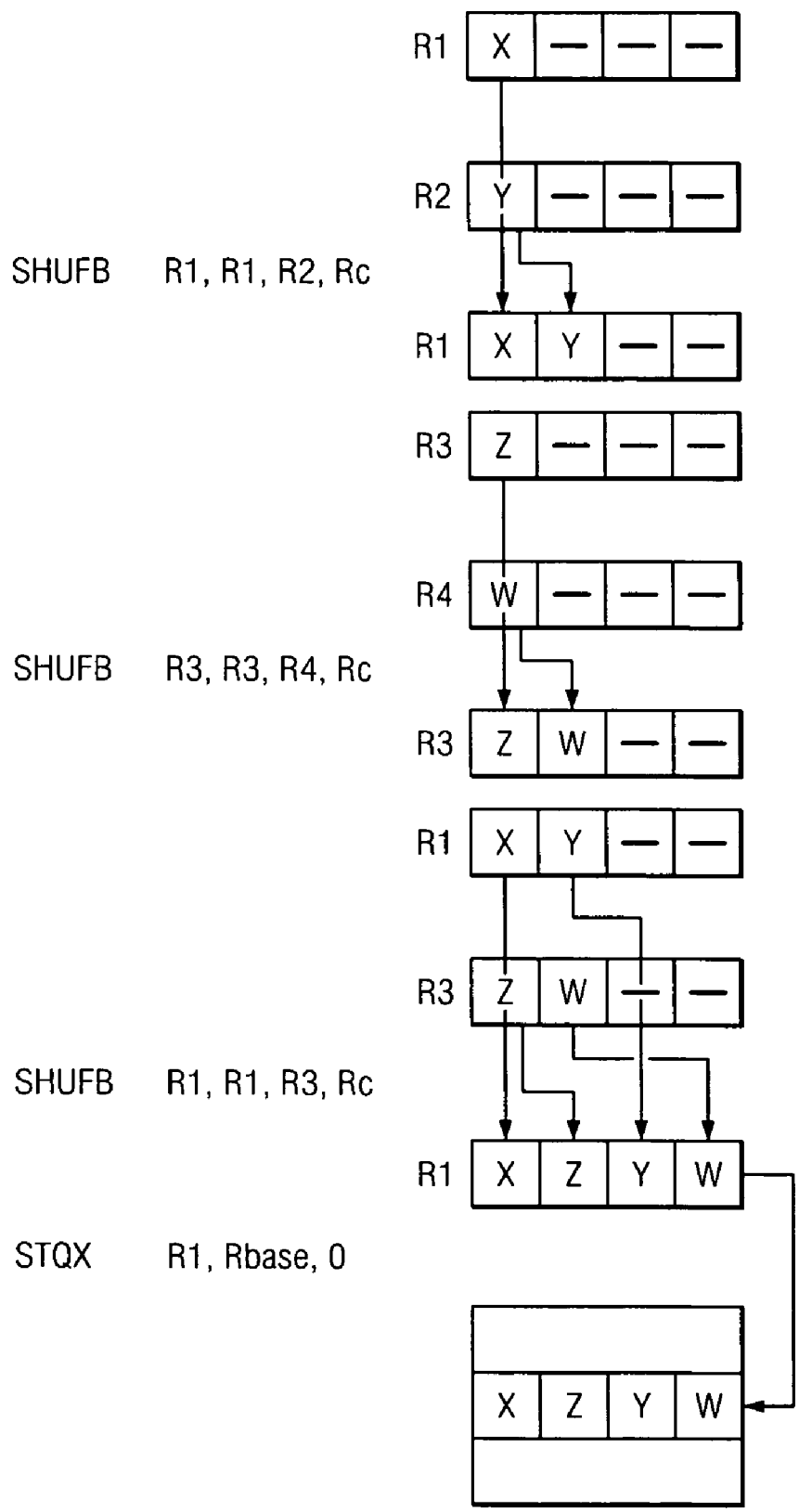

FIGS. 13A and 13B depict exemplary source code sequences comparing spill using only store to memory instructions and spill using pack and store instructions in accordance with an illustrative embodiment. In FIG. 13A, an exemplary fashion is shown for the spilling of 4 scalar words stored in vector registers of 128 bit length, there is obtained a reduction of words to be stored first in a store queue, and then in the stack frame, from 64 bytes to 16 bytes, with commensurate improvements as a result of lower store queue fullness, and more efficient cache utilization.

In accordance with the exemplary code sequence of FIG. 13B, a single "shuffle byte" ("shufb") control word in a register Rc (corresponding to a vector of {0x00010203, 0x10111213, 0x04050607, 0x14151617} for the specific example where a single control word is used for all here combining steps). Those skilled in the art will appreciate how to apply the teachings contained herein to use other instructions for packing scalar values into vectors for improved spill code efficiency.

Reload of spilled values is optimized commensurately by reducing the number of load operations, and reload address computation operations.

Figure 14:
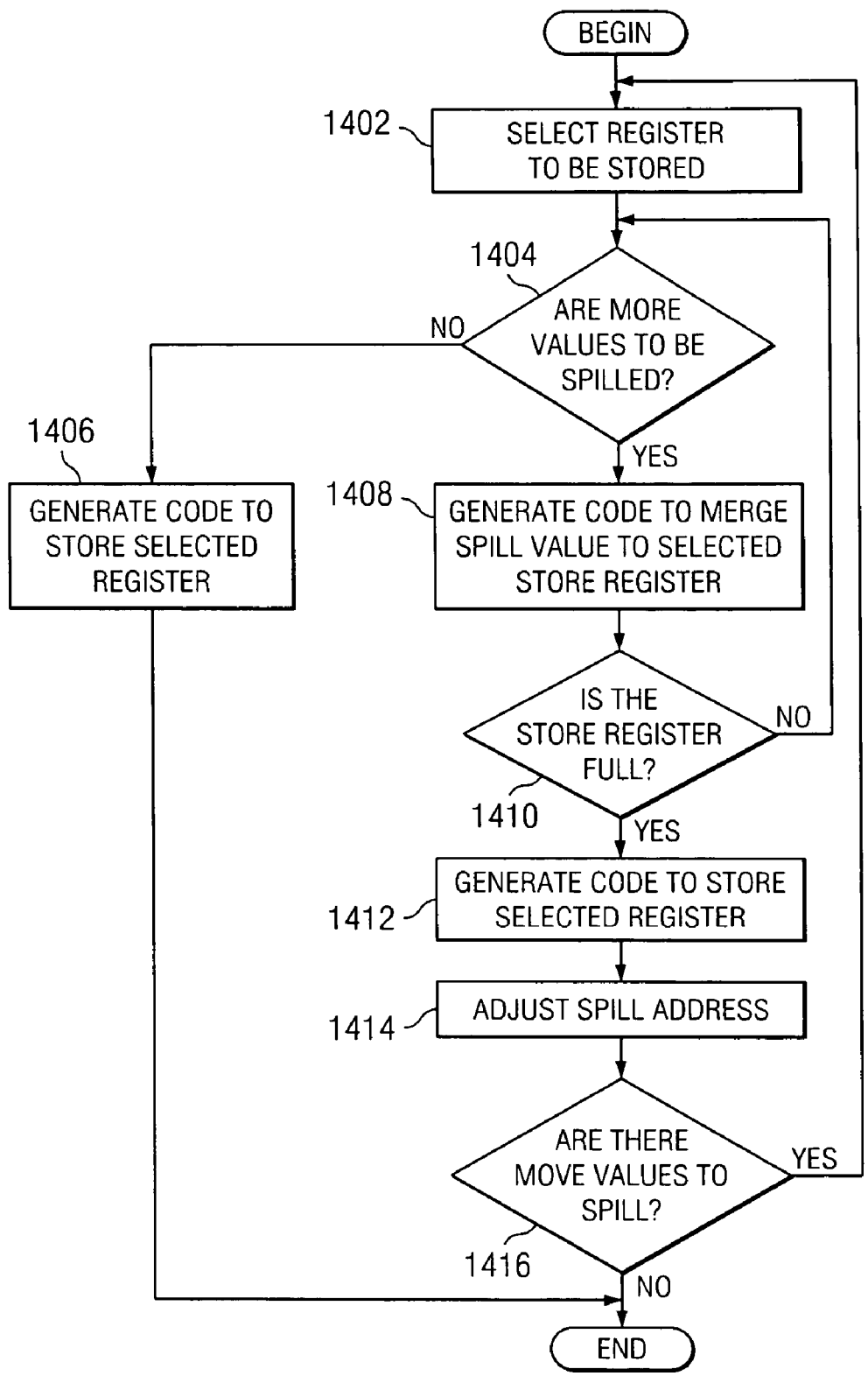
FIG. 14 depicts a flowchart for implementing the spill code optimization in accordance with an illustrative embodiment.

Having thus shown the benefits of optimizing spill code when performing scalar computation in vector registers, we now refer to FIG. 14 which depicts a flowchart for implementing the spill code optimization in accordance with an illustrative embodiment. The operation described in FIG. 14 may be performed by a compiler and the compiler may be either static or dynamic. As the operation begins, a register is selected that is to be stored in memory (step 1402). A determination is then made as to whether more values are to be spilled (step 1404). If no more values are to be spilled, code is generated to store the selected register to memory (step 1406), with the operation ending thereafter. If at step 1404 more values are to be spilled, code is generated to merge the value to be spilled from its register into the selected store candidate register (step 1408). Those skilled in the art will understand that the register which has been merged into the store candidate is now available for use in other computations. The store candidate must be retained.

Then a determination is made as to whether the store candidate register is full (step 1410). If additional values may be merged into the store candidate register, the operation returns to step 1404. If at step 1410 a store candidate cannot accept additional spill values to be merged in, code is generated to store the selected store candidate register (step 1412). Those skilled in the art will understand that the stored register is now available for other uses. Then the spill address is optionally adjusted by generating code to increment a register (step 1414). A determination is then made as to whether more values are to be spilled (step 1416). If more values are to be spilled, the operation returns to step 1402, otherwise the method terminates.

Those skilled in the art will understand that code generation may refer to generating intermediate representation pseudo-code, or actual machine code. Those skilled in the art will also understand other optimizations, such as generating alternate spill code sequences based on data merge, for example, building a variety of merge data flows corresponding to tress, lists, or other dependence graph structures, using different instructions to merge data, and so forth.

Figure 15:
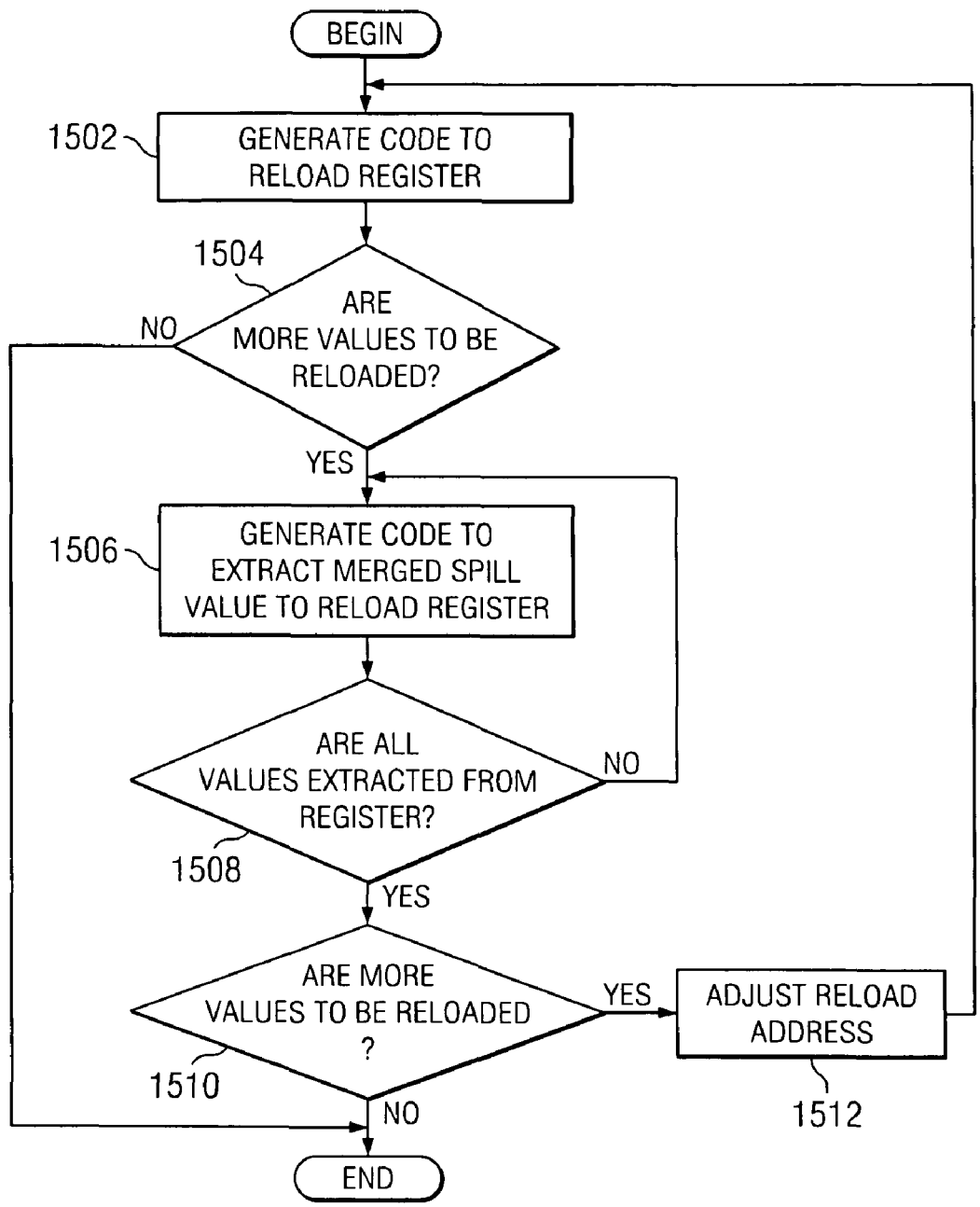
FIG. 15 depicts a flowchart for reloading spilled values in accordance with an illustrative embodiment.

FIG. 15 depicts a flowchart for reloading spilled values in accordance with an illustrative embodiment. The operation described in FIG. 15 may be performed by a compiler and the compiler may be either static or dynamic. As the operation begins, code is generated to reload a register (step 1502). A determination is made as to whether additional spilled values should be reloaded (step 1504). If no additional values are to be reloaded, the operation terminates. If at step 1504 additional values are to be reloaded, code is generated to extract a spilled value from the reloaded register which has been previously merged into the register in accordance with the operation described in FIG. 14 (step 1506).

A determination is then made as to whether additional values should be extracted from the reloaded register (step 1508). If additional values are to be extracted, the operation returns to step 1506. If at step 1508 no additional values are to be extracted, a determination is made as to whether more values should be reloaded (step 1510). If no more values should be reloaded, the operation terminates. If at step 1510 more values should be reloaded the reload address is optionally adjusted by generating code to adjust a register holding a reload address (step 1512) with the operation returning to step 1502 thereafter.

Those skilled in the art will understand that code generation may refer to generating intermediate representation pseudo-code, or actual machine code. Those skilled in the art will also appreciate that merging multiple scalar spill values into a single vector register may free up a sufficient number of vector registers such that no actual spill to memory is necessary in accordance with the illustrative embodiments, and register pressure may be relieved to a point where internal merge and extract operations are sufficient such that no actual memory store and load operations are necessary. Those skilled in the art will also understand how to apply the teachings of the illustrative embodiments, and specifically how to modify the operations described in FIGS. 14 and 15 to merge data, but not store registers containing merged data. Those skilled in the art will also appreciate that registers containing multiple spill values cannot be reallocated until all spill values resident therein are either no longer needed, or have been extracted.

In accordance with another optimization method used in conjunction with compilation methods translating scalar application code to a data-parallel execution engine, there is provided a method to use subword results generated by a variety of SIMD RISC instructions.

In one optimized embodiment with respect to the processing of subword data types, an optimization method, in accordance with the illustrative embodiments, identifies at least one subword operation to be performed on application data. This optimization may be conditionally performed, e.g., in response to the presence of an operation which may be more efficiently performed on a subword data type (such as including, but not limited to, one of multiply and divide), or to avoid the need to extend a subword data type to an integer. Those skilled in the art will appreciate that in many instances, data type conversion or subword data load with automatic zero- and sign-extension to a full word type may be accomplished without additional cost, obviating the need for such optimization in many instances.

In accordance with one definition of an instruction operating on subword results, a vector subword element instruction is used. In other instances, such an instruction is not provided, but a vector word element instruction may be used to generate a valid subword result to corresponding to the number of valid input subword bytes.

Specifically, a vector word element instruction may be used to generate a subword data type result if the output set of result bytes in a (word, vector or other) subslice corresponding to the subword data type is exclusively a function of the input bytes in a (word, vector or other) subslice corresponding to the subword data type. Specifically, if a subword is defined to consist of a range of k bytes starting at byte n up to a byte n+k-1, an instruction is a valid subword instruction only if an instruction generates a computationally correct result in this slot regardless of the contents of bytes not within this range. Alternatively, if a compiler may prove that values in other bytes cannot influence the correctness of the result in the byte subslice, additional instructions may be used.

Specifically, logical operations not having bit- or byte-crossing semantics, such as vector AND, vector OR, data-parallel select, and so forth, may be used as subvector operations for any data type, and any possible data layout, and a preferred SIMD RISC architecture only supports a single vector-wide form of these operations because of their flexibility of use with respect to sub-vector data types.

In accordance with the semantics of operations such as "add" ("a"), "add immediate" ("ai"), these and similar operations include carry-over from low order positions to high order positions, and may only be used to generate a subword result if a vector subword element instruction is provided (such as "add halfword" "ah" and "add halfword immediate" "ahi"), breaking data carry-over from lower-order bits, or when a subword data type is allocated within the low-order positions of a wider data type, where the breaking of data carry-over for the subword data type is coincident with that for the wider data type. For example, the "add" ("a"), or "add halfword" ("ah") instructions may be used to generate byte addition results in accordance with data layouts of FIGS. 4A and 4C, because the break in data carry-over for byte addition is coincident-with that of halfword and word addition in these data layouts, but not in a data layout in accordance with FIG. 4B. (However, the compiler could use AH or A instructions in this scenario if the compiler may deduce that the contents of data contained in byte 1, and bytes 1-3, respectively, do not cause carry-over into byte 0, or cause the contents of the bytes to be of such nature as not to trigger carry-over.)

In another aspect of instructions being used for subword computation, some operations generate correct results exclusively for a subword data type when the subword data type is coincident with the low-order positions of the wider data type at which they are directed, e.g., such as in the definition of multiplication. Such operations may be used exclusively in embodiments having data layouts corresponding to such requirements, e.g., such as multiplication in conjunction with data layout in accordance with FIGS. 4A and 4C. Performing subword multiplication is furthermore attractive in at least one embodiment of a SIMD RISC architecture, where a full word multiplication must be synthesized as a sequence of specialized subword operations, but one of these subword operation is sufficient to generate correct results for subword data types.

Finally, some subvector operations cannot be readily generated from any wider data type operations, such as including, but not limited to, the divide operation. (Transformations based on extending a dividend, but not a divisor, allow addressing efficient computation in this context and are within the scope of the illustrative embodiments.)

Referring now to another aspect of compilation for a SIMD RISC architecture in accordance with the illustrative embodiments, in one embodiment of a SIMD RISC architecture, vector instructions including power- and/or energy-saving features for use in conjunction with computing a scalar result are provided. In one exemplary embodiment of such energy efficient implementation, a portion of the data path is de-energized. De-energizing may be performed using a wide range of implementation choices, including, but not limited to, one of clock gating and Vdd-gating (supply voltage gating). In accordance with one optimized embodiment of compiling scalar code for a SIMD RISC architecture, the scalar nature of operations is preserved throughout the entire compilation process (e.g., using at least one scalar indicator in the internal representation), and instructions with the de-energizing features are generated in response to the presence of such indicator.

In one architectural specification of a vector instruction having energy- and power-efficient features, the computation slot is indicated. In accordance with one embodiment of compiling scalar code on a SIMD RISC architecture, slot position information is maintained with all internal representation operations, and the slot indication is encoded in at least one instruction word. In another embodiment of a SIMD RISC architecture, a scalar indicator causes a predetermined set of slots to be de-energizes, such as for example all slots not corresponding to the preferred slot, and the compiler will generate code in accordance with this specification.

In one embodiment of a SIMD RISC architecture, the non-compute bytes are set to one of a predetermined default value (such as, for example, "0"), or left in a boundedly undefined state.

While one preferred embodiment performs the methods described herein in conjunction static analysis and offline compilation, those skilled in the art will understand that the specific features and methods described herein may be implemented in a variety of software components, such as static compilers, dynamic compilers, dynamic optimizers, binary translators, hardware translation engines, and so forth.

These and other features and advantages of the illustrative embodiments may be readily ascertained by one of ordinary skill in the pertinent art based on the teachings herein. It is to be understood that the teachings of the illustrative embodiments may be implemented in various forms of hardware, software, firmware, special purpose processors, or combinations thereof.

Most preferably, the teachings of the illustrative embodiments are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the illustrative embodiments are programmed. Given the teachings herein, one of ordinary skill in the pertinent art will be able to contemplate these and similar implementations or configurations of the illustrative embodiments.

Although the illustrative embodiments have been described herein with reference to the accompanying drawings, it is to be understood that the illustrative embodiments are not limited to those precise embodiments, and that various changes and modifications may be effected therein by one of ordinary skill in the pertinent art without departing from the scope or spirit of the illustrative embodiments. All such changes and modifications are intended to be included within the scope of the illustrative embodiments as set forth in the appended claims.

The illustrative embodiments can take the form of an entirely hardware embodiment, an entirely software embodiment or an embodiment containing both hardware and software elements. In a preferred embodiment, the illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, infrared, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments has been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer implemented method for generating code to perform scalar computations on a SIMD RISC architecture, the computer implemented method comprising:
   generating code directed at loading at least one scalar value;
   generating code using at least one vector operation to generate a scalar result, wherein all scalar computation for integer and floating point data is performed in a SIMD vector execution unit;
   determining whether an alignment amount can be determined statically at compile time, wherein the alignment amount can be determined statically when at least a portion of an address can be derived;
   in response to determining that the alignment amount can be determined statically at compile time:
      generating first alignment code using the alignment amount determined at compile time; and
      inserting the first alignment code into the code that was generated to generate a scalar result;
   in response to determining that the alignment amount cannot be determined statically at compile time:
      generating dynamic code to dynamically compute the alignment amount;
      generating second alignment code using the alignment amount computed dynamically; and
      inserting the dynamic code and the second alignment code into the code that was generated to generate a scalar result; and
   wherein the first and second alignment code aligns scalar data with respect to a vector register.

2. The computer implemented method of claim 1, wherein the code is generated corresponding to scalar computation being performed in the SIMD vector execution unit and operating on at least one of an address or condition information.

3. The computer implemented method of claim 2, wherein the code is generated using the at least one address specified to machine instructions in a preferred slot.

4. The computer implemented method of claim 1, wherein the alignment amount is indicated by a memory address of a data element.

5. The computer implemented method of claim 1, wherein the alignment code is generated further including one of a zero-extension or a sign-extension, using an optional dual shift sequence.

6. The computer implemented method of claim 1, wherein the generated code is generated to perform scalar computation in a preferred slot.

7. The computer implemented method of claim 1, further comprising:
identifying the slot to be used for the scalar computation for each scalar operation.

8. The computer implemented method of claim 7, further comprising:
optimizing data layout of scalar data with respect to a register.

9. The computer implemented method of claim 1, further comprising:
generating spill code to spill an entire vector register containing a subvector value.

10. The computer implemented method of claim 1, wherein an aligned spill area is allocated and code is generated to merge multiple scalar values into a single vector register and spill the register to memory.

11. The computer implemented method of claim 1, wherein multiple scalar values are merged to reduce register pressure and the merged data is retained in a processor register.

12. The computer implemented method of claim 1, wherein at least one subword result is generated to improve code performance.

13. The computer implemented method of claim 1, wherein at least one vector instruction directed at computing a scalar result, while deenergizing a portion of the data path, is generated.

14. A data processing system comprising:
a bus system;
a communications system connected to the bus system;
a memory connected to the bus system, wherein the memory includes a set of instructions; and
a processing unit connected to the bus system, wherein the processing unit executes the set of instructions to generate code directed at loading at least one scalar value; generate code using at least one vector operation to generate a scalar result, wherein all scalar computation for integer and floating point data is performed in a SIMD vector execution unit; determine whether an alignment amount can be determined statically at compile time, wherein the alignment amount can be determined statically when at least a portion of an address can be derived; in response to determining that the alignment amount can be determined statically at compile time: generate first alignment code using the alignment amount determined at compile time; and insert the first alignment code into the code that was generated to generate a scalar result; in response to determining that the alignment amount cannot be determined statically at compile time: generate dynamic code to dynamically compute the alignment amount; generate second alignment code using the alignment amount computed dynamically; and insert the dynamic code and the second alignment code into the code that was generated to generate a scalar result; and wherein the first and second alignment code aligns scalar data with respect to a vector register.

15. The data processing system of claim 14, wherein the code is generated corresponding to scalar computation being performed in the SIMD vector execution unit and operating on at least one of a address or condition information.

16. A computer program product comprising:
a computer usable medium including computer usable program code for generating code to perform scalar computations on a SIMD RISC architecture, the computer program product including:
computer usable program code for generating code directed at loading at least one scalar value;
computer usable program code for generating code using at least one vector operation to generate a scalar result, wherein all scalar computation for integer and floating point data is performed in a SIMD vector execution unit
computer usable program code for determining whether an alignment amount can be determined statically at compile time, wherein the alignment amount can be determined statically when at least a portion of an address can be derived;
in response to determining that the alignment amount can be determined statically at compile time:
computer usable program code for generating first alignment code using the alignment amount determined at compile time; and
computer usable program code for inserting the first alignment code into the code that was generated to generate a scalar result;
in response to determining that the alignment amount cannot be determined statically at compile time:
computer usable program code for generating dynamic code to dynamically compute the alignment amount;
computer usable program code for generating second alignment code using the alignment amount computed dynamically; and
computer usable program code for inserting the dynamic code and the second alignment code into the code that was generated to generate a scalar result; and
wherein the first and second alignment code aligns scalar data with respect to a vector register.

17. The computer program product of claim 16, wherein the code is generated corresponding to scalar computation being performed in the SIMD vector execution unit and operating on at least one of an address or condition information.

* * * * *